United States Patent [19]
Maruyama

[11] Patent Number: 5,551,823
[45] Date of Patent: Sep. 3, 1996

[54] TRANSFER APPARATUS HAVING TRACTION PIN MOVED WITH HEIGHT DIFFERENCE

[75] Inventor: Asao Maruyama, Himeji, Japan

[73] Assignee: Tsubakimoto Chain Co., Osaka, Japan

[21] Appl. No.: 289,867

[22] Filed: Aug. 12, 1994

[30] Foreign Application Priority Data

Aug. 20, 1993 [JP] Japan ................................ 5-226684
Aug. 27, 1993 [JP] Japan ................................ 5-051174 U

[51] Int. Cl.⁶ ........................................................ B65G 1/04
[52] U.S. Cl. .................................... 414/280; 414/277
[58] Field of Search .......................... 414/277, 280, 414/282, 661, 331

[56] References Cited

U.S. PATENT DOCUMENTS

| | | | |
|---|---|---|---|
| 4,352,622 | 10/1982 | Wieschel | 414/277 |
| 4,358,239 | 11/1982 | Dechantsreiter | 414/661 |
| 4,361,411 | 11/1982 | Di Liddo | 414/277 |
| 4,556,355 | 12/1985 | Glater | 414/280 |
| 4,812,102 | 3/1989 | Smith et al. | 414/280 |
| 5,199,840 | 4/1993 | Castaldi et al. | 414/280 |
| 5,213,463 | 5/1993 | Rothlisberger et al. | 414/280 |
| 5,328,316 | 7/1994 | Hoffmann | 414/280 |

FOREIGN PATENT DOCUMENTS

| | | | |
|---|---|---|---|
| 2482057 | 11/1981 | France | 414/750 |
| 2545010 | 4/1977 | Germany | 414/280 |
| 2743395 | 12/1978 | Germany | 414/280 |
| 0055010 | 3/1986 | Japan | 414/280 |
| 3025458 | 12/1993 | WIPO | 414/280 |

*Primary Examiner*—James W. Keenam
*Attorney, Agent, or Firm*—Quarles & Brady

[57] ABSTRACT

A transfer apparatus for moving a stored article between a movable table and a storage rack has a traction pin carried on an endless chain or belt with the chain or belt in a plane which is inclined to horizontal or is vertical. A pressing pin may be provided on the chain or belt for pushing the stored article off of the moving table onto the storage rack for transferring the stored article between two storage racks, with the table between racks. The apparatus may be provided with two, three or four rotors for the chain or belt.

3 Claims, 29 Drawing Sheets

TRANSFER APPARATUS HAVING TRACTION PIN MOVED WITH HEIGHT DIFFERENCE

BACKGROUND OF THE INVENTION

1. Field of the Invention

The present invention relates transferring stored articles, which has a simple and high strength structure.

2. Discussion of the Prior Art

As an example of a transfer apparatus assembled in a movable table moved along an article storage rack for transferring a stored article between the storing rack and the movable table, there has been known a type shown in FIGS. 17 to 19.

A transfer apparatus 30 includes four sprockets 34 (see FIG. 17) disposed in a rectangular geometry on a horizontal lift table (transfer table) 33 lifted and lowered along an article storage rack 31 (see FIG. 18), a chain 35 wound around the sprockets 34, a traction pin 36 erected on the chain 35 for engaging a handle (portion to be engaged) H of a stored article W, and a pressing pin 37 for abutting the outside of the handle H.

The traction pin 36 is positioned outside the moving region or path of the pressing pin 37. This is because, unless the traction pin 36 is moved outside the moving region of the pressing pin 37, the traction pin 36 cannot catch the handle.

The stored article W is transferred by a method wherein the traction rain 36 catches the handle H to draw the stored article W on the lift table 33 (see FIG. 19), and then the pressing pin 37 pushes the stored article W into an article storage rack (not shown) disposed on the left side of FIGS. 18 and 19.

When one of the traction pin 36 and the pressing pin 37 is moved on the lift table 33, the other pin is depressed by a guide 38 so as not to interfere with the bottom of the stored article W.

The traction pin 36 and the pressing pin 37 are depressed against springs 39 and 40, to be thus sunk in the lift table 33.

FIGS. 20 and 21 shows another example of the transfer apparatus.

In a transfer apparatus 50, an engaging lever 52 provided between a pair of parallel transfer chains 51 and 51 is circulated generally horizontally but with a portion of its path traversing a vertical distance, to engage a handle H of a stored article W, thus transferring the stored article between a lift table (not shown) and a storing rack (not shown).

The transfer chain 51 is circulated by drive chains 53 and 53.

The transfer apparatus 30 shown in FIGS. 17 to 19, however, requires the structure that the traction pin 36 and the pressing pin 37 are capable of extending from and retracting into the lift table, and further, it requires the guide 38 for extending and retracting the traction pin 36 and the pressing pin 37. This causes a disadvantage in complicating the structure.

Moreover, after a long period of service, the operation of extending and retracting the traction pin and the pressing pin becomes uncertain due to wear, thereby making unreliable the transfer of stored articles.

On the other hand, the transfer apparatus 50 shown in FIGS. 20 and 21 has a disadvantage that the spacing between the pair of transfer chains 51 and 51 and the drive chains 53 and 53 must be made wider than the width of a stored article, thereby enlarging the size of the lift table.

Moreover, when an error is generated in the relative positional relationship between the pair of transfer chains 51 and 51, the engaging lever 52 becomes skewed, tending not to engage the handle H.

SUMMARY OF THE INVENTION

An object of the present invention is to provide a transfer apparatus capable of reliably transferring a stored article with a simple structure. To achieve this, the present invention provides a first transfer apparatus assembled in a movable table moved along an article storage rack for transferring a stored article between the article storage rack and the movable table which includes first and second rotors which are arranged along the transfer direction of the stored article such that the rotational shafts are perpendicular to the transfer direction and are inclined to the horizontal plane or horizontal. An endless chain or belt is wound around the first and second rotors and a traction pin is erected on the chain or belt in such a manner as to be in parallel to the rotational shafts for engaging a portion to be engaged of the stored article.

In another aspect of the invention, a pressing pin is provided on the chain or belt in such a manner as to be in parallel to the rotational shafts for abutting the stored article. The traction pin is erected in such a manner as to be spaced apart from the pressing pin and to be outside the moving region or path of the pressing pin.

In this aspect, a third rotor may be provided at a position lower than the first and second rotors such that the rotational shaft of the third rotor is in parallel to the rotational shafts of the first and second rotors and the chain or a belt wound around the first, second and third rotors.

In addition, the first, second and third rotors may be provided at such positions as to guide part of the chain or belt substantially in parallel to the portion to be engaged.

In another aspect, the traction and/or pressing pins may be provided on the chain or belts by brackets, and the brackets may be perpendicular to the rotational shafts.

Article storage racks include a vertical rack in which areas for containing stored articles are vertically arranged, and a horizontal rack in which the areas are horizontally arranged. Movable tables include a lift table lifted and lowered along a vertical rack, and a transversely moving table moved along a horizontal rack. The present invention may be applied to both types of storage racks and movable tables.

The traction pin or the traction and pressing pins, if applicable, are moved integrally with the chain or belt which is moved by the rotors. With only a traction pin, the transfer apparatus is adapted to transfer a stored article between one article storage rack and the movable table moved along the article storage rack using the height difference of the traction pin generated when it moves along a vertical plane (if the rotational shafts are horizontal) or a plane inclined to the horizontal plane (if the rotational shafts are inclined to the horizontal plane).

The transfer of a stored article is thereby performed as follows:

First, the rotors are rotated, to move the chain or belt.

The traction pin is moved integrally with the chain or belt while being guided by the inclined or vertical rotors. When being moved along the rotors, the traction pin is moved from the lower position to the higher position. During this movement, the traction pin engages the portion to be engaged.

The traction pin is furthermore moved for drawing a stored article from the article storage rack to the movable table.

Next, the movable table transfers the stored article to the desired rack stage.

The traction pin is then reversely moved by the chain or belt, so that the stored article is pushed in another rack stage. The traction pin is continued to be reversely moved along the rotors, and is moved from the high position to the lower position, to be removed from the portion to be engaged.

The transfer of the stored article is thus completed.

When a pressing pin is provided, the transfer apparatus is adapted to transfer a stored article between the article storage racks provided on both sides of the movable table using the height differences of the traction pin and the pressing pin as they move along the vertical or inclined plane.

The transfer of a stored article is performed as follows:

First, the rotors are rotated, to move the chain or belt.

The traction pin is moved integrally with the chain or belt while being guided by the inclined or vertical rotors. When being moved along one rotor, the traction pin is moved from the lower position to the higher position. During this movement, the traction pin engages the portion to be engaged which is provided at one end of the stored article.

The traction pin is furthermore moved for drawing a stored article from one article storage rack to the movable table.

Next, the movable table transfers the stored article to the desired rack stage of another article storage rack.

The traction pin is then furthermore moved in the same direction by the chain or belt along the other rotor from the higher position to the lower position, to be removed from the portion to be engaged.

During this movement, the pressing pin is also moved in the same direction as the traction pin by the chain or belt. Accordingly, after the traction pin is removed from the portion to be engaged, the pressing pin presses the portion to be engaged which is provided at the other end of the stored article, and pushes the stored article from the movable table into the above desired rack stage.

The transfer of the stored article is thus completed.

If a third rotor is provided, the traction pin and the pressing pin are adapted to be moved by the third rotor to positions lower than if only two rotors are provided. The third rotor lengthens the chain or belt so that the spacing between the traction pin and the pressing pin is increased over the spacing with only two rotors.

When the traction pin draws a stored article from the article storage rack onto the movable table, the pressing pin is moved under the stored article. Moreover, when the pressing pin presses the stored article on the movable table, the traction pin is removed from engagement with the portion engaged and is moved under the stored article.

In this way, when one pin is moved on the movable table, the other pin is moved under the stored article; however, they are moved while being guided by the third rotor at the lower positions so as not to interfere with the bottom of the stored article.

Accordingly, when the traction pin is removed from the portion to be engaged at one end of the stored article, and the pressing pin is pressed to the portion to be engaged at the other end of the stored article for pushing the stored article in the storing rack, a sufficient time lag exists until the pressing pin abuts the portion to be engaged at the other end after the traction pin is removed from the portion to be engaged at one end. As a result, the pressing pin does not abut the portion to be engaged at the other end until after the traction pin is removed from the portion to be engaged at the one end.

When the first, second and third rotors are arranged so as to guide part of the chain or belt substantially in parallel to the portion to be engaged, the traction pin can be moved in a manner to be substantially in parallel to the portion to be engaged, thereby making it possible to reliably perform the engagement of the traction pin with the portion to be engaged.

These and other objects and advantages of the invention will be apparent from the drawings and the detailed description of the preferred embodiments.

DETAILED DESCRIPTION OF THE PREFERRED EMBODIMENTS

Hereinafter, embodiments of the present invention in which the rotors are inclined to the horizontal plane will be described with reference to FIGS. 1 to 16. Embodiments of the present invention in which the rotors are vertical will be described with reference to FIGS. 22–33.

First, a first transfer apparatus 60 will be described with reference to FIGS. 1 to 5.

The first transfer apparatus 60 (see FIG. 1) is assembled in a lift table (movable table) 62 which is lifted and lowered along one article storage rack 61 (see FIG. 4) for transferring a tray (or stored article) T between a rack stage 63 of the article storage rack 61 and the lift table 62.

The tray T contains workpieces (not shown), and handles (portions to be engaged) H and H are mounted at both ends of the tray T.

Figure 4:
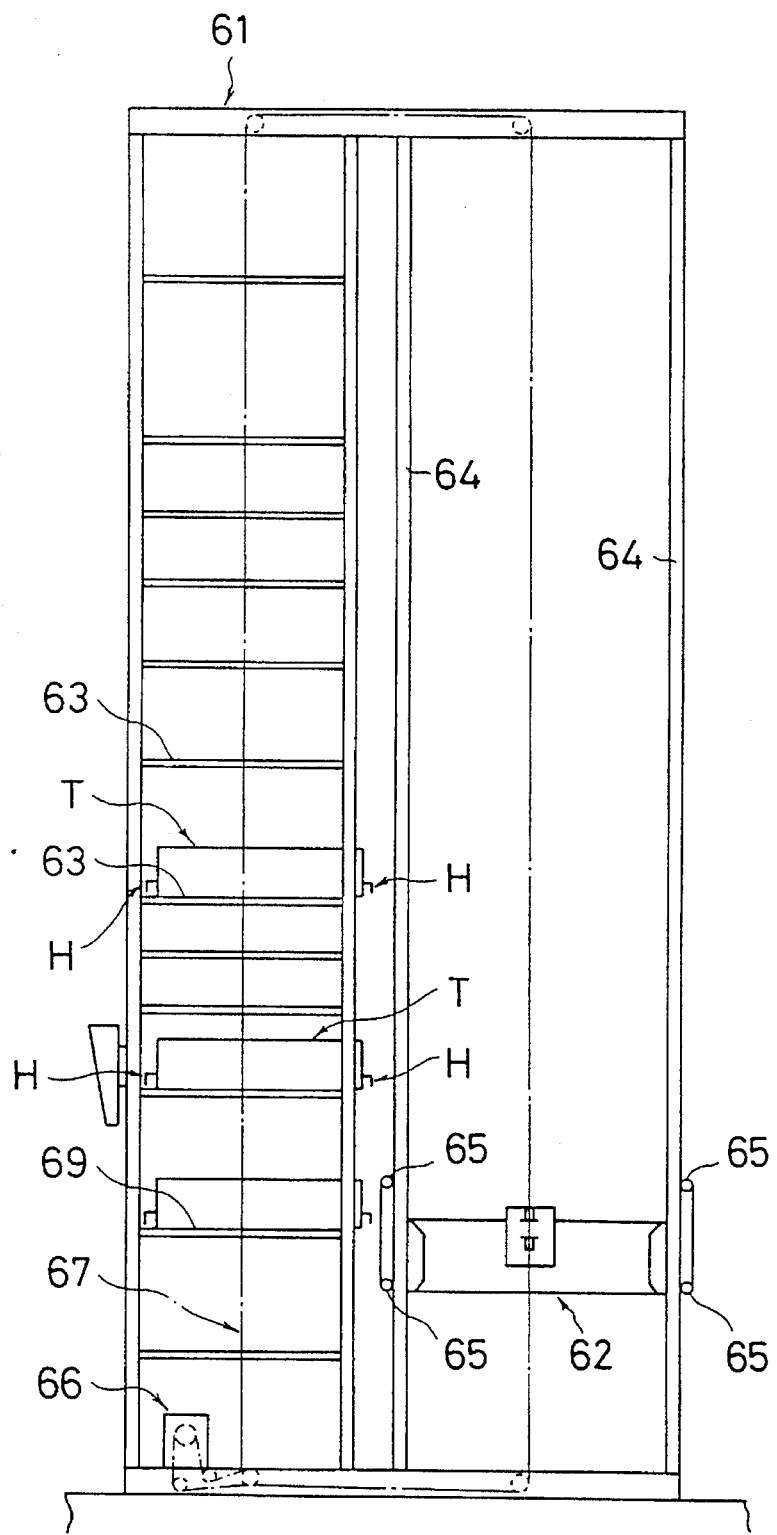
FIG. 4 is a front view of an article storage rack, and a lift table in which the first transfer apparatus is assembled.

Each handle H of the tray T is formed of a plate folded at right angles downwardly, as shown in FIG. 4.

The lift table 62 (see FIGS. 1 and 4) is lifted and lowered by a motor 66 while being guided by four columns 64 and rollers 65. The motor 66 is connected to the lift table 62 by means of a chain 67.

Roller conveyors 68 (see FIG. 1) in the number of three pieces are provided on the lift table 62 for smoothly transferring the tray T.

The first transfer apparatus 60 (see FIG. 1) includes first and second sprockets (rotors) 71 and 72, chains 74 and a traction pin 75.

The first and second sprockets 71 and 72 are arranged along the transfer direction of the tray T (in the direction of the arrow A).

Two of the first sprockets 71 and two of the second sprockets 72 are rotatably provided on an inclined plate 77 (see FIG. 3) mounted on the lift table 62. Rotational shafts 81 and 82 of the first and second sprockets 71 and 72 are inclined to the horizontal plane.

The rotational shaft 81 of the first sprocket 71 is connected to a motor 78 (FIG. 3) with a reduction gear.

The chains 74 are wound around the first and second sprockets 71 and 72.

The traction pin 75 (see FIG. 3) to engage the handle H of the tray T is erected on the chains 74 so as to be in parallel to the rotational shafts 81 and 82 of the first and second sprockets 71 and 72.

The traction pin 75 (see FIGS. 2 and 3) is erected on the traction pin bracket 80 provided on two pins 79 and 79 of the chains 74. The pin 79 connects the two chains 74 to each other.

Each chain 74, which is circulated by the inclined first and second sprockets 71 and 72, is guided by a chain guide 84 (see FIG. 1) provided on the inclined plate 77 so as not to be loosened.

The operation of the first transfer apparatus 60 will be described below.

The first transfer apparatus 60 is adapted to transfer the tray T between one article storage rack 61 and the movable table 62 using the height difference of the traction pin 75 generated when it moves along the plane inclined to the horizontal plane.

Figure 1:
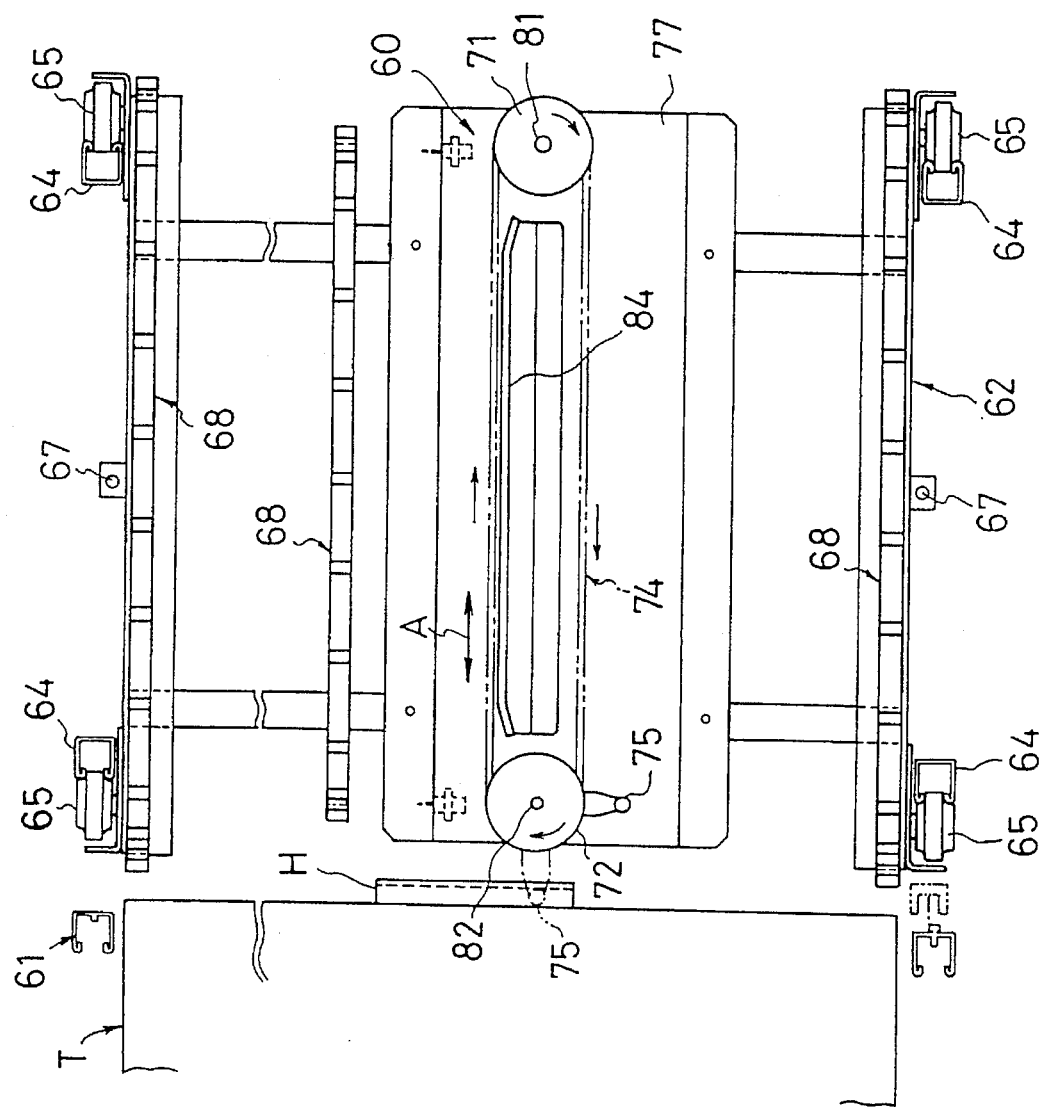
FIG. 1 is a plan view of an embodiment of a first transfer apparatus of the present invention.
Figure 2:
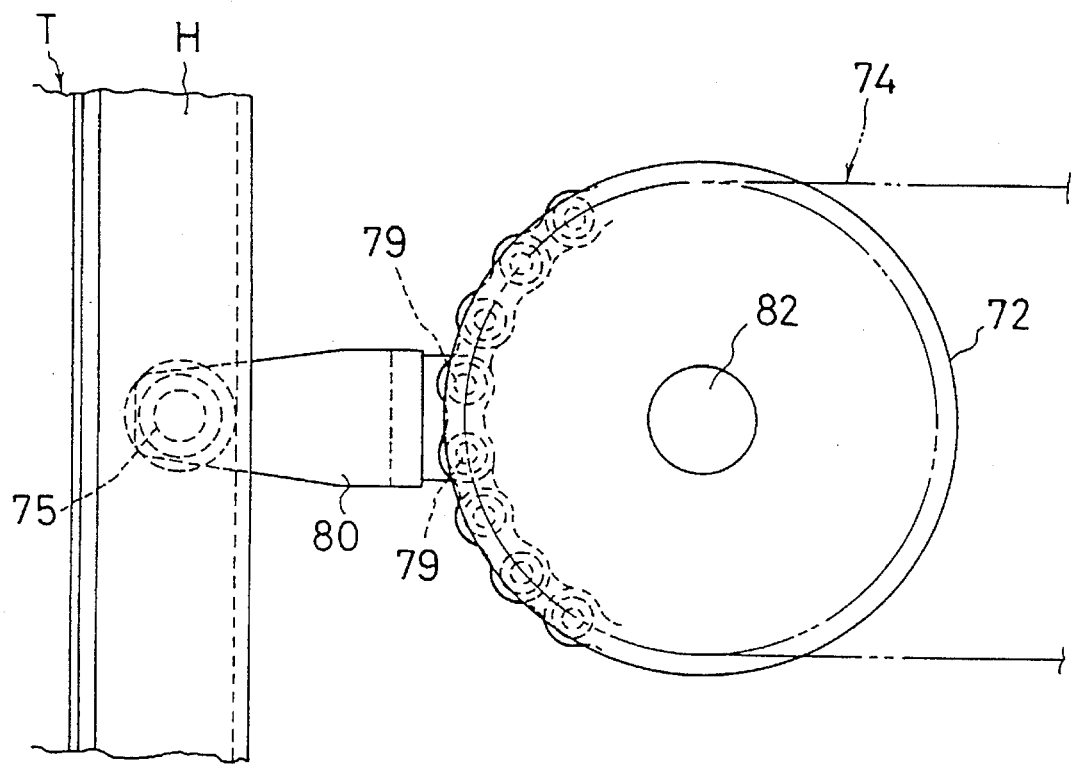
FIG. 2 is a front view of an engagement pin of the first transfer apparatus.
Figure 3:
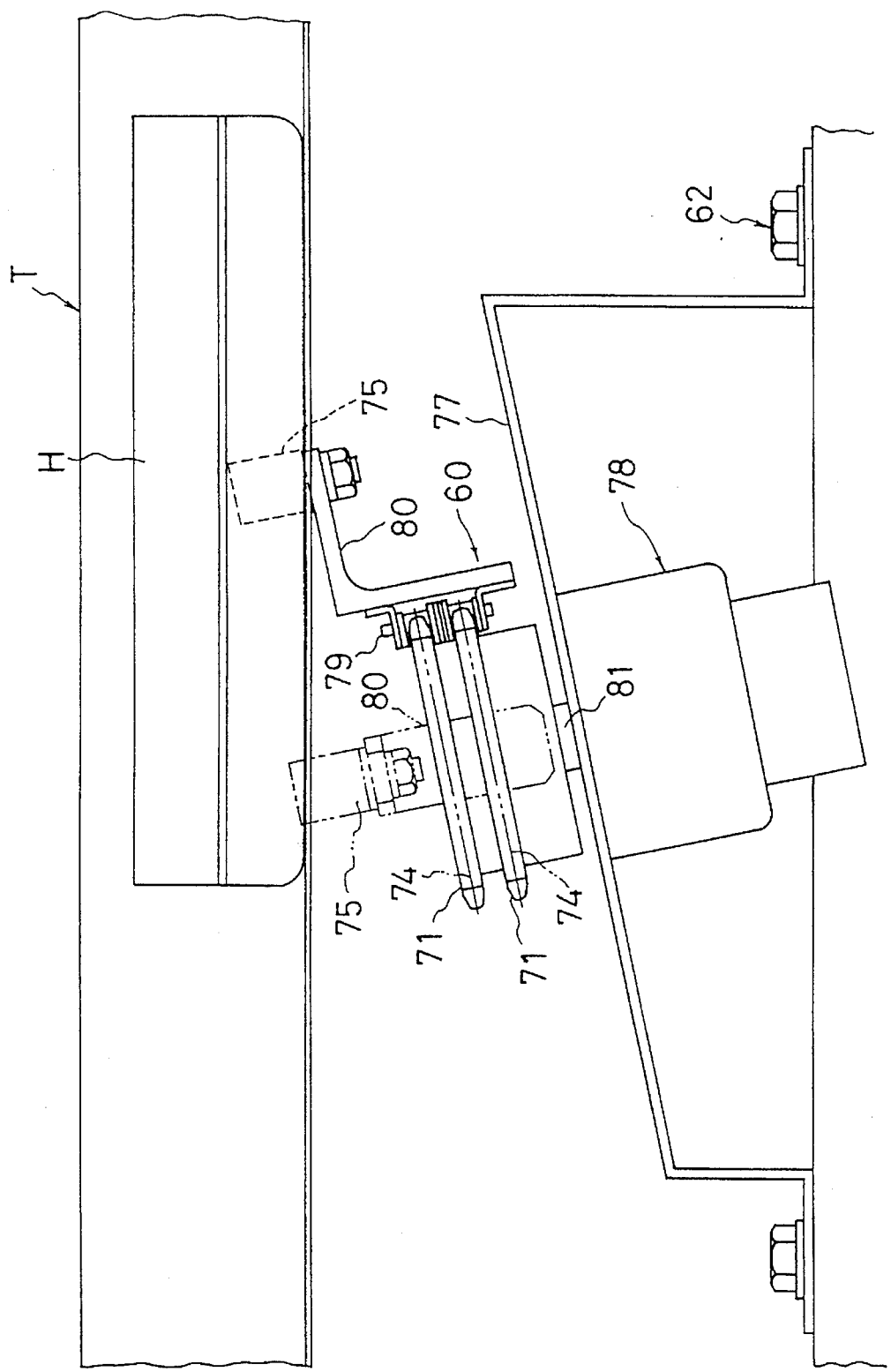
FIG. 3 is a view of the first transfer apparatus showing the state where the engagement pin engages a handle of a tray as seen from the right side of FIG. 1.

First, in FIG. 1, the chains 74 are rotated rightwardly (circulated clockwise), to move the traction pin 75 along the second sprockets 72.

Since the second sprockets 72 are inclined, the traction pin 75 is moved from the lower position shown by the solid line to the higher position shown by the imaginary line, to engage, from the lower side, the handle H of the tray T stored in the article storage rack 61 by way of a storing/delivering port 69 (see FIG. 4).

The chains 74 are furthermore rotated rightwardly (clockwise), so that the traction pin 75 is moved from the left to the right in FIG. 1. During this movement, the leading edge of the traction pin 75 protrudes upwardly from the upper surface of the roller conveyors 68.

Figure 5:
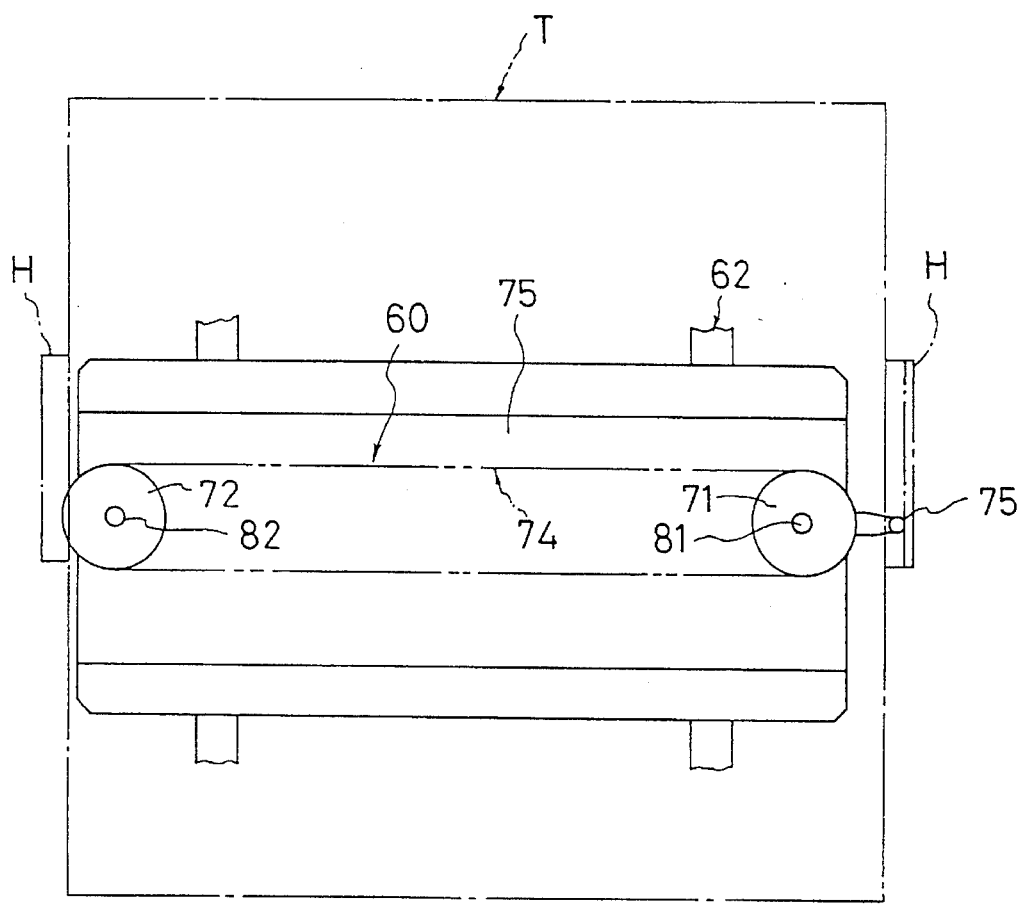
FIG. 5 is a view for explaining the operation of the first transfer apparatus.

The tray T is thus drawn from the storing/delivering port 69 onto the life table 62, and the rotation of the chains 74 is stopped (see FIG. 5).

The lift table 62 is lifted up to the desired rack stage 63 and stopped.

The length of the tray T (the length in the transverse direction in FIG. 5) is set such that the tray T, when lifted by the lift table 62, does not abut the handle H of any tray T contained in the article storage rack 61.

The chains 74 are then rotated leftwardly in FIG. 5 (circulated counterclockwise), to move the traction pin 75 from the right to the left, thus pushing the tray T in the desired rack stage 63. The chains 74 are rotated further leftwardly, so that the traction pin 75 is moved along the second sprocket 72. The traction pin 75 is moved from the higher position to the lower position, and is removed from the handle H.

The transfer of the tray T is thus completed.

Next, the second transfer apparatus will be described with reference to FIGS. 6 to 10.

A second transfer apparatus 160 (see FIG. 6) is assembled in a lift table 162 (movable table) lifted and lowered between first and second article storage racks 161 and 170 (see FIG. 7) erected in parallel to each other for transferring a tray T (or stored article) between rack stages 163 of the article storage racks 161 and 170.

The lift table 162 itself has substantially the same structure as that of the lift table 62 shown in FIG. 1, and therefore, each of the same parts is designated by affixing 1 to the head of the numeral shown in FIG. 1, and the explanation of the structure is omitted.

The second transfer apparatus 160 (see FIG. 6) includes first and second sprockets 171 and 172, chains 174, a traction pin 175 and a pressing pin 176.

The second transfer apparatus 160 has substantially the same structure as that of the first transfer apparatus 60 shown in FIG. 1, except for the pressing pin 176. Therefore, each of the same parts is designated by affixing 1 to the head of the numeral shown in FIG. 1, and the explanation thereof is omitted.

The pressing pin 176 (see FIG. 10) is erected on a pressing pin bracket 185 provided on two pins 179 and 179 of the chains 174. Alternatively, an arbitrary pin of the chain 174 may be made longer to be substituted for the pressing pin 176 provided on the pressing pin bracket 185.

In addition, after being pushed from the lift table 162 into the article storage rack 161 or 170 by the pressing pin 176, the tray T can be drawn onto the lift table 162 as needed. To draw the tray T onto the table 162, the traction pin 175 must catch the handle H. For this purpose, a spacing L1 between the chains 174 (see FIG. 6) and the traction pin 175 is set to be wider than a spacing L2 between the chains 174 and the pressing pin 176. The difference is larger than a plate thickness D of the handle H.

Namely, the traction pin 175 is provided outside the area where the pressing pin 176 is moved (i.e., outside of the moving region of the pressing pin 176).

The pressing pin 176 and the traction pin 175 are provided on the chains 174 at positions opposed to each other.

The operation of the second transfer apparatus 160 will be described below.

The second transfer apparatus 160 is adapted to transfer the tray T between the first and second article storage racks 161 and 170 using the height differences of the traction pin 175 and the pressing pin 176 moved along the plane inclined to the horizontal plane.

Figure 6:
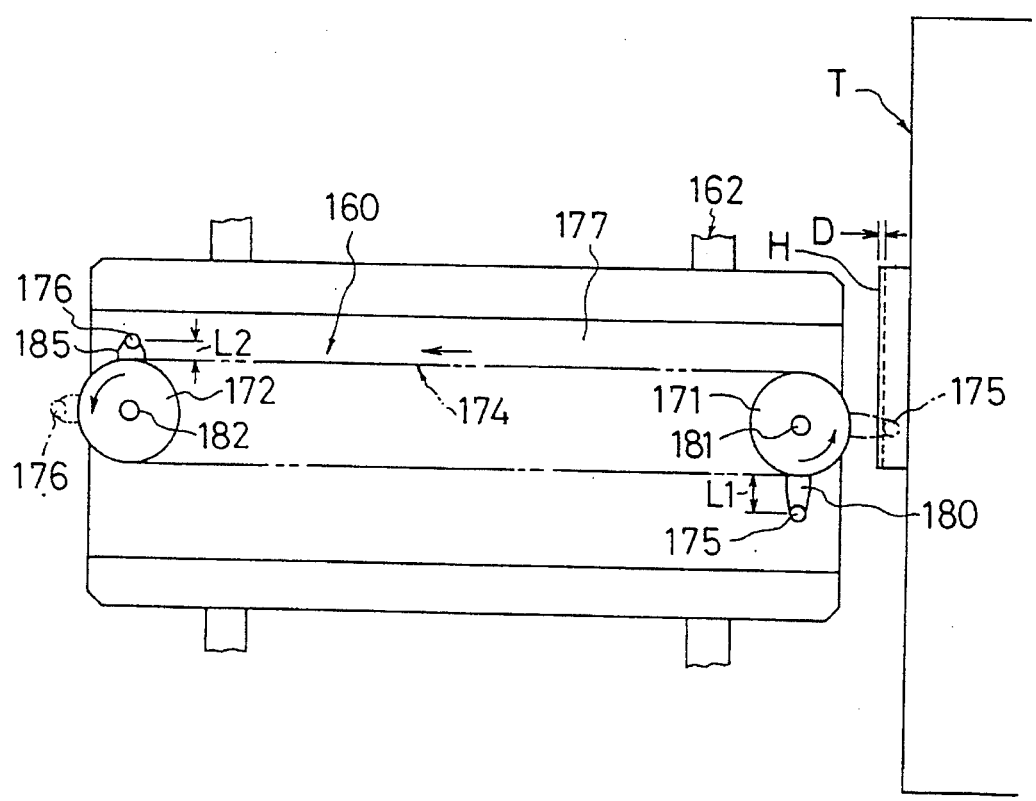
FIG. 6 is a plan view of an embodiment of a second transfer apparatus of the present invention.

First, in FIG. 6, the chains 174 are rotated leftwardly (circulated counterclockwise), to move the traction pin 175 along the first sprockets 171.

Figure 7:
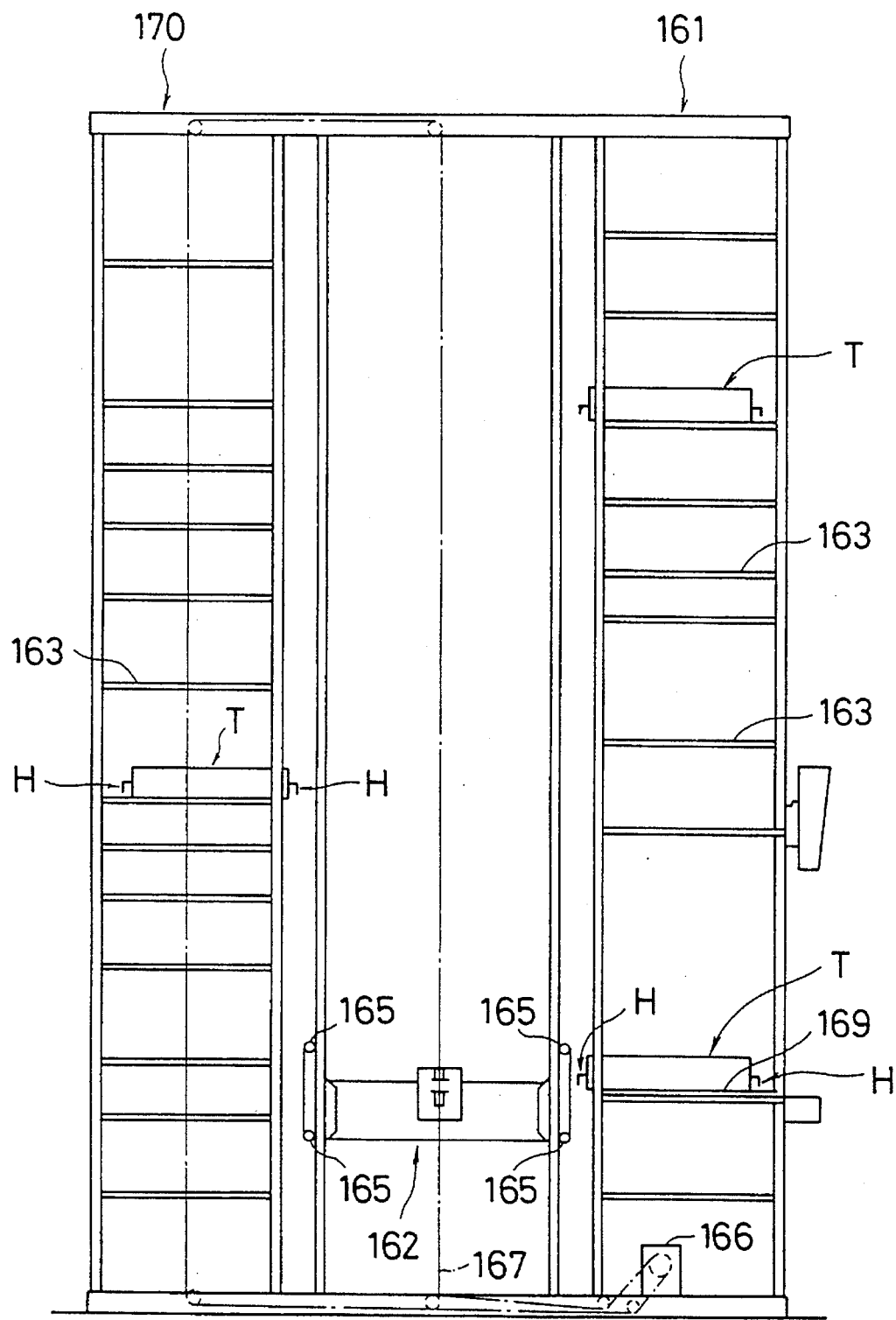
FIG. 7 is a front view of an article storage rack, and a lift table in which the second transfer apparatus is assembled.

Since the first sprockets 171 are inclined, the traction pin 175 is moved from the lower position shown by the solid line to the higher position shown by the imaginary line, to engage, from the lower side, the handle H of the tray T stored in the first article storage rack 161 by way of the storing/delivering port 169 (see FIG. 7).

The chains 174 are rotated further leftwardly (counterclockwise), and the traction pin 175 is moved from the right to the left in FIG. 6. During this movement, the leading edge of the traction pin 175 protrudes upwardly from the upper surface of roller conveyors (not shown).

Figure 8:
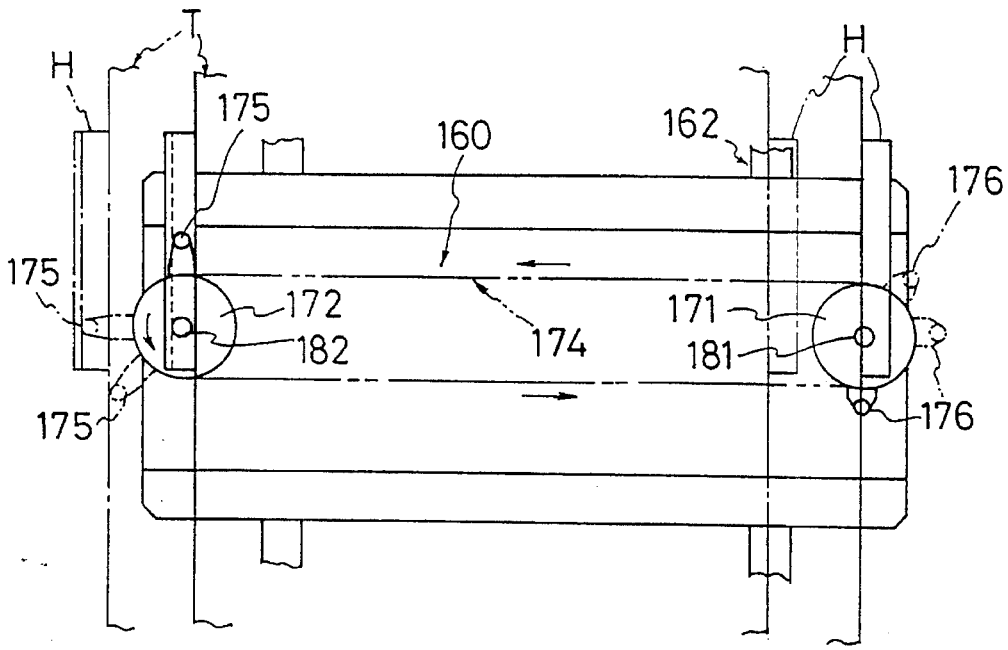
FIG. 8 is a view for explaining the operation of the second transfer apparatus.
Figure 9:
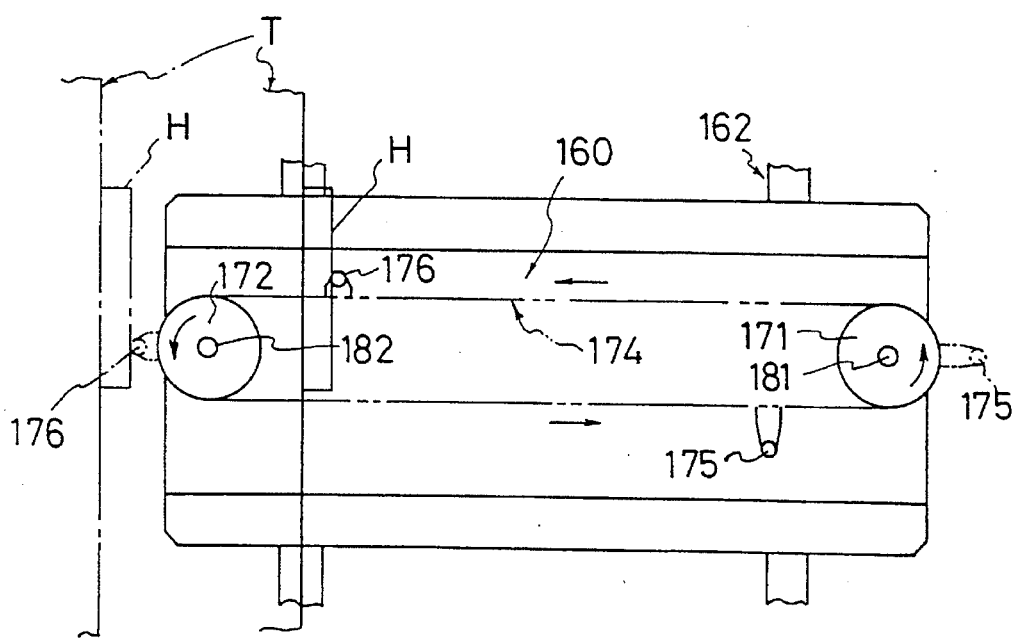
FIG. 9 is a view for explaining the operation of the second transfer apparatus.
Figure 10:
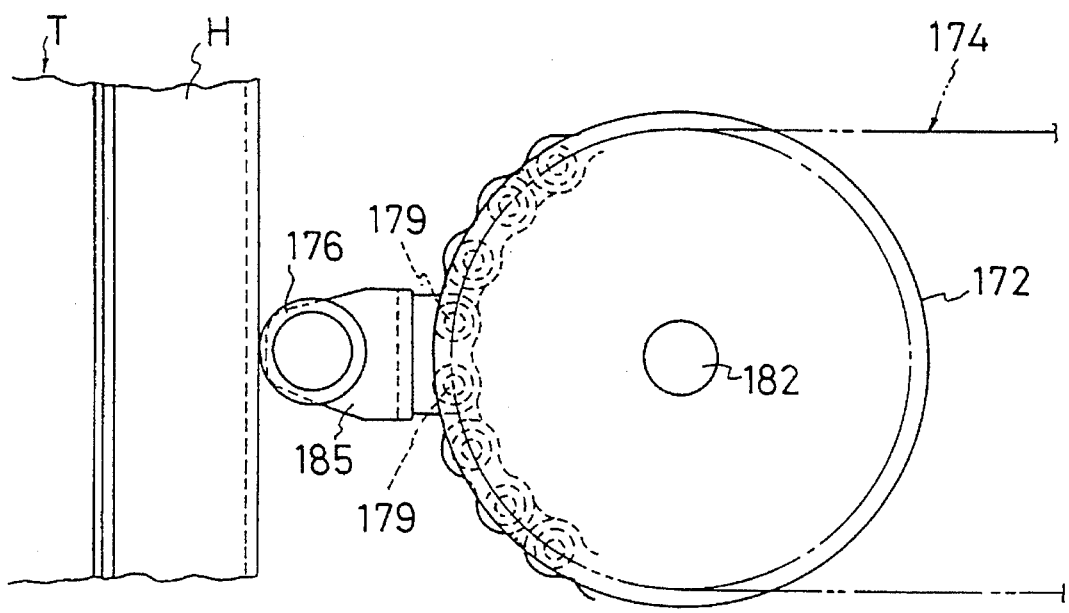
FIG. 10 is a plan view of a pressing pin of the second transfer apparatus.

The tray T is thus drawn from the storing/delivering port 169 of the first article storage rack 161 onto the lift table 162, and the rotation of the chains 174 is stopped (see FIG. 8).

On the other hand, the pressing pin 176 is located at a position lower than that of the traction pin 175 so as not to abut the bottom of the tray T.

The lift table 162 is lifted up to the desired rack stage 163, and is stopped.

The chains 174 are then rotated leftwardly in FIG. 8, and the traction pin 175 is moved from the right to the left. The traction pin 175 draws the left end portion of the tray T into the desired rack stage 163 of the second article storage rack 170, and is simultaneously moved along the second sprockets 172. The traction pin 175 is thus moved from the higher position to the lower position, to be removed from the handle H.

The chains 174 are furthermore rotated leftwardly. The pressing pin 176 is moved along the first sprockets 171 from the lower position to the higher position, to engage the handle H provided at the right end of the tray T.

The chains 174 are furthermore rotated leftwardly. The pressing pin 176 presses the handle H provided at the right end of the tray T, to move the tray T from the right to the left on the lift table 162 (see FIG. 9), and pushes it into the desired rack stage 163 of the second article storage rack 170.

The transfer of the tray T from the storing/delivering port 169 to the second article storage rack 170 is thus completed.

In addition, when the chains 174 are rotated rightwardly from the state shown in FIG. 8, the traction pin 175 is moved from the left to the right, so that the tray T can be pushed in the desired rack stage 163 of the first article storage rack 161.

The second transfer apparatus 160 is also capable of transferring the tray T between the rack stages 163 in the second article storage rack 170.

The length of the tray T used in the second transfer apparatus 160 (the transverse length in FIG. 8) is set such that the pressing pin 176 abuts the handle H provided at the right end of the tray T after the traction pin 175 is removed from the handle H provided at the left end of the tray T.

Next, the third transfer apparatus will be described with reference to FIGS. 11 to 14.

The third transfer apparatus 260 (see FIG. 11) is assembled in a lift table 262 which is lifted and lowered between first and second article storage racks erected in parallel to each other for transferring the tray T between the rack stages (not shown) of the two article storage racks.

The lift table 262 itself has substantially the same structure as that of the lift table 62 shown in FIG. 1, and therefore, each of the same parts is designated by affixing 2 to the head of the numeral shown in FIG. 1, and the explanation of the structure is omitted.

The third transfer apparatus 260 includes first, second and third sprockets 271, 272 and 273, chains 274, a traction pin 275 and a pressing pin 276.

In addition, the third transfer apparatus 260 has substantially the same structure as that of the second transfer apparatus 160 shown in FIG. 6, except for the third sprockets 273. Therefore, each of the same parts is designated by changing the head of the numeral shown in FIG. 6 from 1 to 2, and the explanation of the structure is omitted.

Each third sprocket 273 is rotatably provided on an inclined plate 277 such that a rotational shaft 283 thereof is in parallel to rotational shafts 281 and 282 of the first and second sprockets 271 and 272.

The third sprockets 273 are provided at the lower positions on the inclined side of the first and second sprockets 271 and 272.

The operation of the third transfer apparatus 260 will be described below.

The third transfer apparatus 260 is also adapted to transfer a tray T between first and second article storage racks using the height differences of the traction pin 275 and the pressing pin 276 generated when they move along a plane inclined to the horizontal plane.

Figure 11:
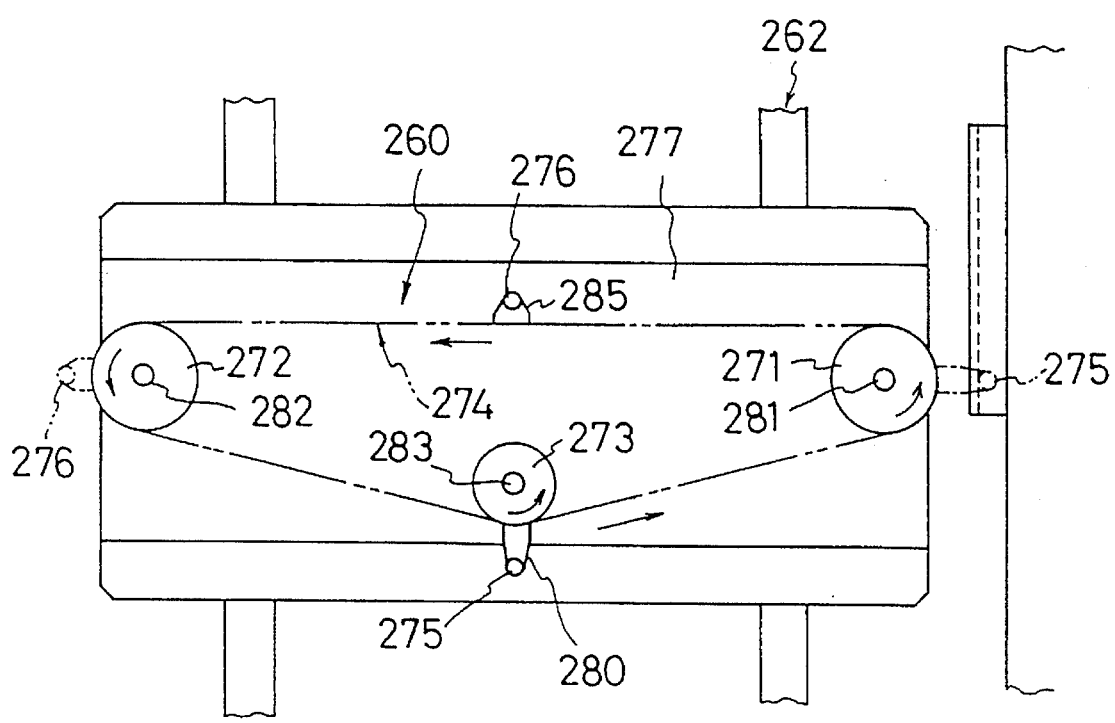
FIG. 11 is a plan view of an embodiment of a third transfer apparatus of the present invention.
Figure 12:
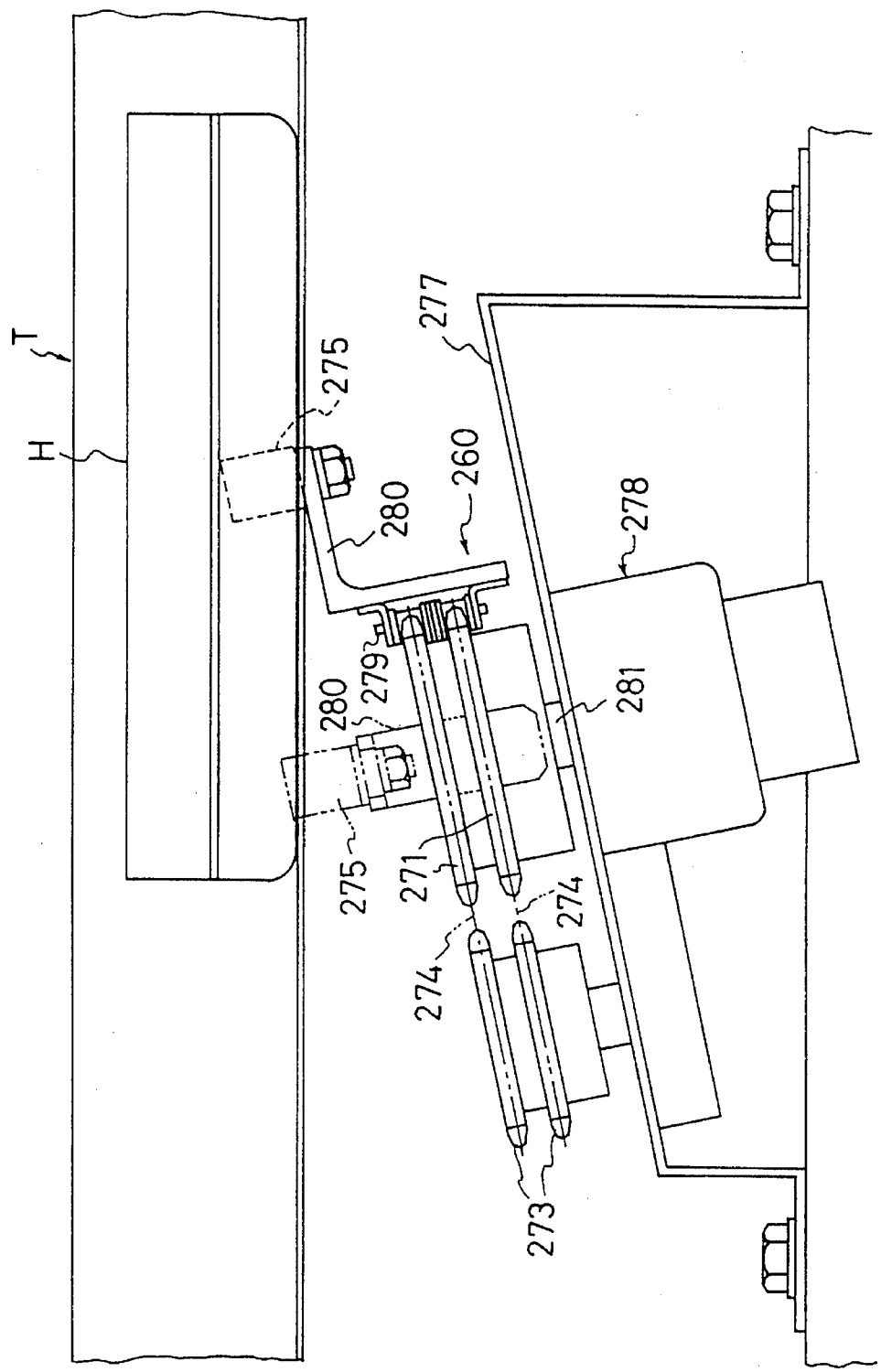
FIG. 12 is a view of the third transfer apparatus showing the state in which an engagement pin engages with a handle of a tray as seen from the right side of FIG. 1, wherein a pressing pin is omitted.

In FIG. 11, the chains 274 are rotated leftwardly (circulated counterclockwise), to move the traction pin 275 from the third sprockets 273 to the first sprockets 271.

The traction pin 275 is moved from the lower position shown by the solid line to the higher position shown by the imaginary line, to engage, from the lower side, a handle H of the tray T stored in the article storage rack by way of a storing/delivering port.

The chains 274 are furthermore rotated leftwardly. The traction pin 275 protrudes upwardly from the upper surface of roller conveyors (not shown) in FIG. 13, to be moved from the right to the left, thus drawing the tray T from the storing/delivering port of the first article storage rack.

On the other hand, the pressing pin 276 is located at a position lower than that of the traction pin 275 so as not to abut the bottom of the tray T.

The lift table 262 is lifted up to the desired rack stage, and is stopped.

Figure 13:
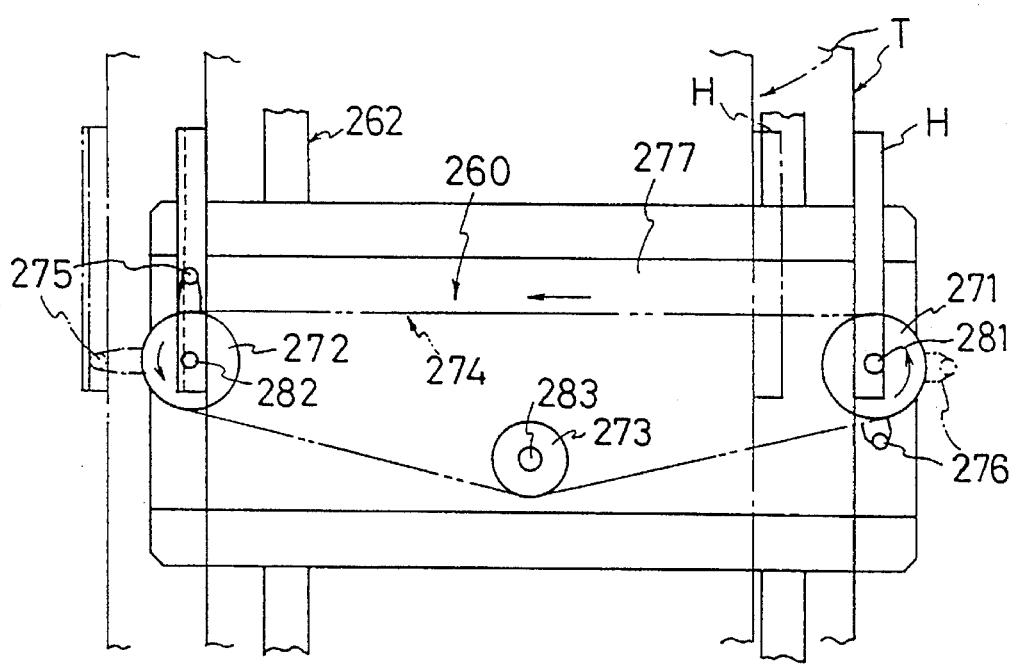
FIG. 13 is a view for explaining the operation of the third transfer apparatus.
Figure 14:
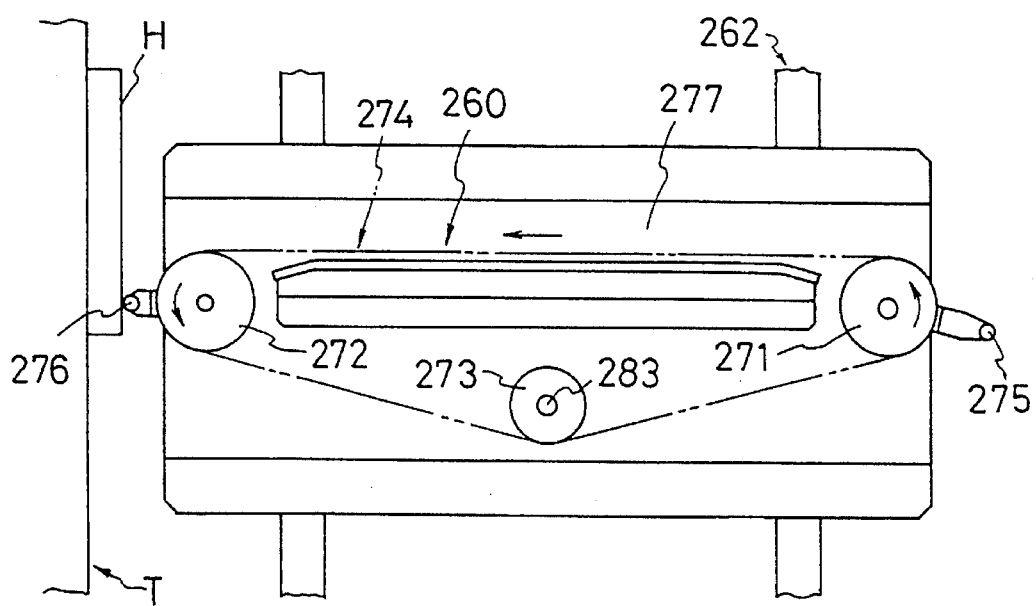
FIG. 14 is a view for explaining the operation of the third transfer apparatus.

The chains 274 are then rotated leftwardly in FIG. 13, and the traction pin 275 is moved from the right to the left. The traction pin 275 draws the left end portion of the tray T into the desired rack stage of the second article storage rack and is simultaneously moved along the second sprockets 272. The traction pin 275 is thus moved from the higher position to the lower position, to be removed from the handle H.

The chains 274 are furthermore rotated leftwardly. The pressing pin 276 is moved along the first sprockets 271 from the lower position to the higher position, and abuts the handle H provided at the right end of the tray T. The pressing pin 276 presses the tray T and moves it from the right to the left on the lift table 262 (see FIG. 14), thus pushing the tray T in the desired rack stage of the second article storage rack.

The transfer of the tray T from the storing/delivering port to the second article storage rack is thus completed.

In addition, when the chains 274 are rotated rightwardly (clockwise) from the state shown in FIG. 13, the traction pin 275 is moved from the left to the right, so that the tray T can be pushed in the desired rack stage of the first article storage rack.

The third transfer apparatus 260 can transfer the tray T between the different rack stages of the second article storage rack.

Since the third transfer apparatus 260 has the structure that the height differences of the traction pin 275 and the pressing pin 276 moved along the plane inclined to the horizontal plane are larger than those in the second transfer apparatus by the third sprockets 273, the traction pin 275 and the pressing pin 276 can certainly escape so as not to abut the bottom of the tray T.

In the third transfer apparatus 260, the whole length of the chain 274 is made longer by the presence of the third sprocket 273, and thereby the spacing between the traction pin 275 and the pressing pin 276 is widened; accordingly, it can be avoided that the pressing pin 276 abuts the other handle H before the traction pin 275 is perfectly removed from one handle H.

Figure 15:
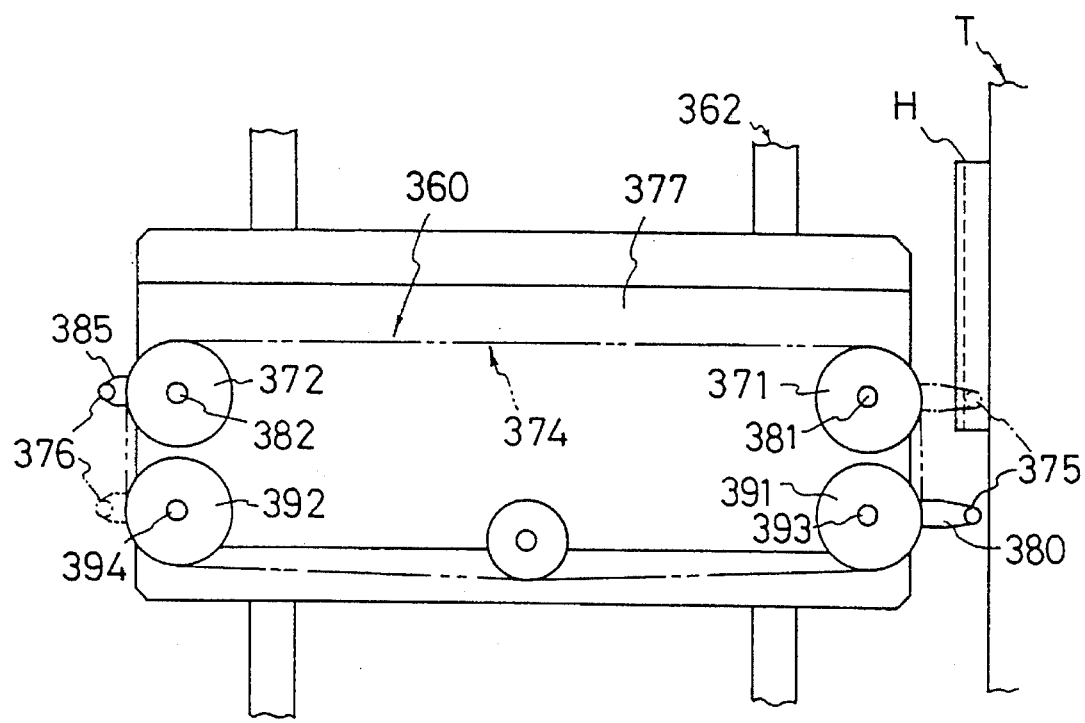
FIG. 15 is a plan view of an embodiment of a fourth transfer apparatus of the present invention.

Next, the fourth transfer apparatus will be described with reference to FIG. 15.

A fourth transfer apparatus 360 is the same as the second transfer apparatus 160 shown in FIG. 6, except that two pairs of third sprockets 391 and 392 are provided such that a traction pin 375 can be moved so as to be substantially in parallel to a handle H when moved near the handle H.

The fourth transfer apparatus 360 includes first, second and third sprockets 371, 372 and 391, 392 having the same diameter, chains 374, a traction pin 375 and a pressing pin 376.

The fourth transfer apparatus 360 has substantially the same structure as that of the second transfer apparatus 160 shown in FIG. 6 except for the third sprockets 391 and 392, and therefore, each of the same parts is designated by changing the number of the head of the numeral shown in FIG. 6 from 1 to 3, and the explanation of the structure is omitted.

The third sprockets 391 and 392 are rotatably provided on an inclined plate 377 such that rotational shafts 393 and 394 thereof are disposed so as to be in parallel to rotational shafts 381 and 382 of the first and second sprockets 371 and 372.

The third sprockets 391 and 392 are provided at the lower positions on the inclined side of the first and second sprockets 371 and 372.

The first sprockets 371 and the one-sided third sprockets 391 are disposed so as to be in parallel to the handle H.

The second sprockets 372 and the other-sided third sprockets 392 are also disposed so as to be in parallel to the handle H.

In the fourth transfer apparatus 360, the traction pin 375 is movable so as to be in parallel to the handle H, thereby making it possible to certainly perform the engagement and disengagement of the traction pin 375 with the handle H.

In addition, the outside diameter of the first sprocket 371 may be different from that of the one-sided third sprocket 391. Moreover, the outside diameter of the second sprocket 372 may be different from that of the other-sided third sprocket 392. In this case, each sprocket may be disposed at such a position that the chains are movable in parallel to the handle.

The fourth transfer apparatus is adapted to be operated in the same manner as those of the second and third transfer apparatuses 160 and 260, so that the description for the operation of the fourth transfer apparatus 360 is omitted.

Figure 16:
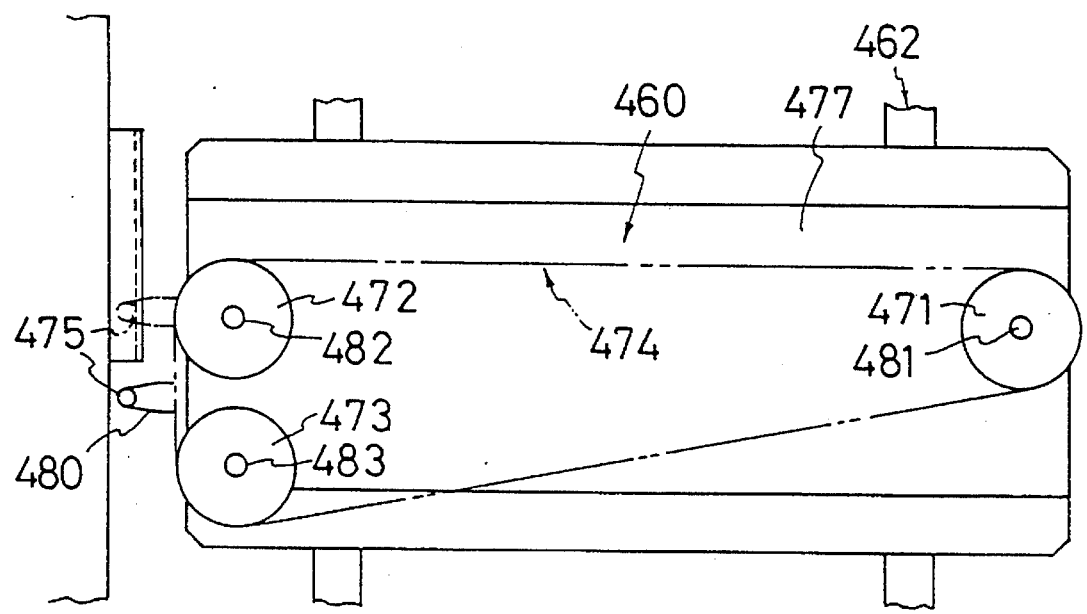
FIG. 16 is a plan view of another embodiment of the fourth transfer apparatus of the present invention.
Figure 17:
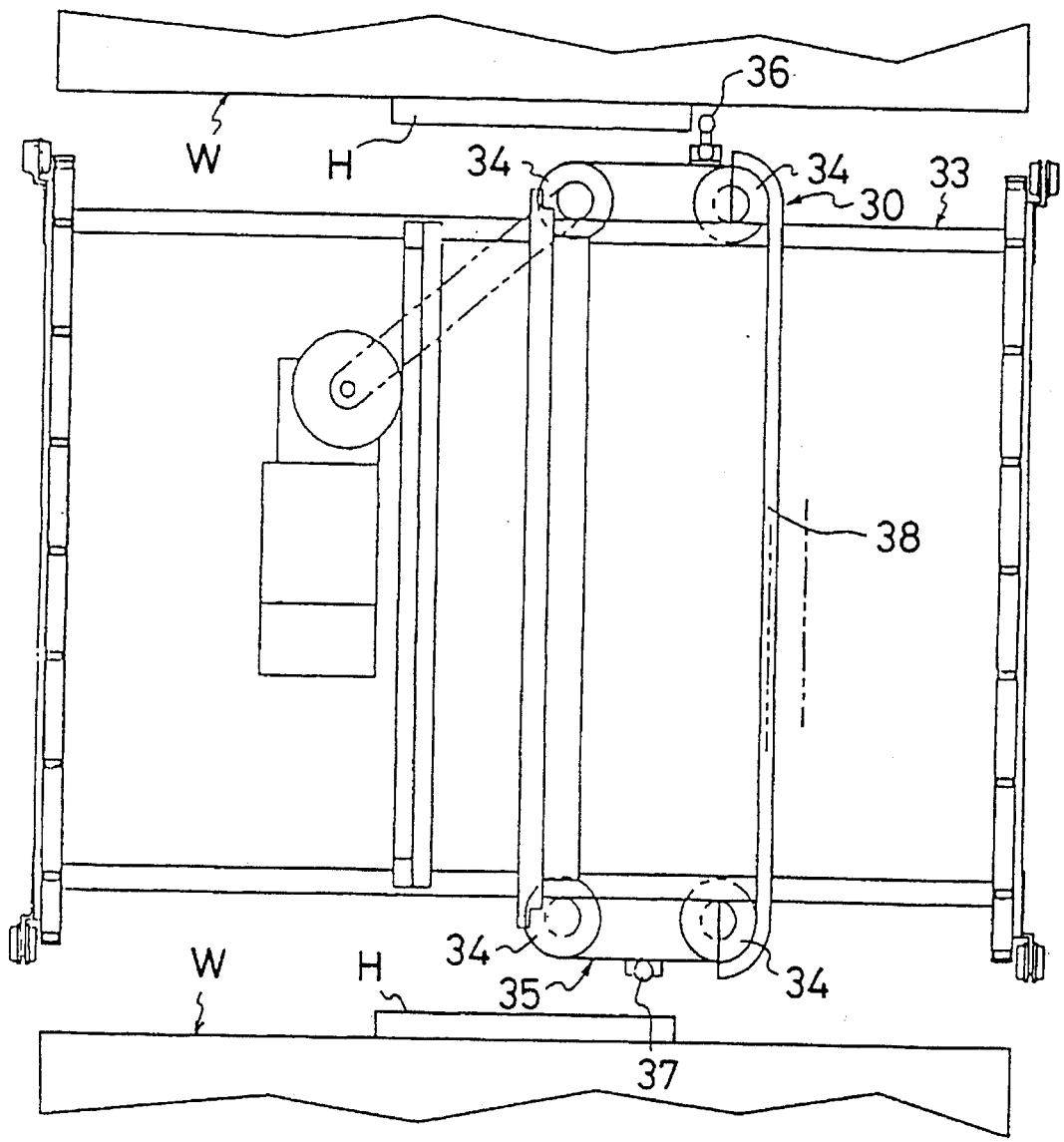
FIG. 17 is a plan view of a prior art transfer apparatus.
Figure 18:
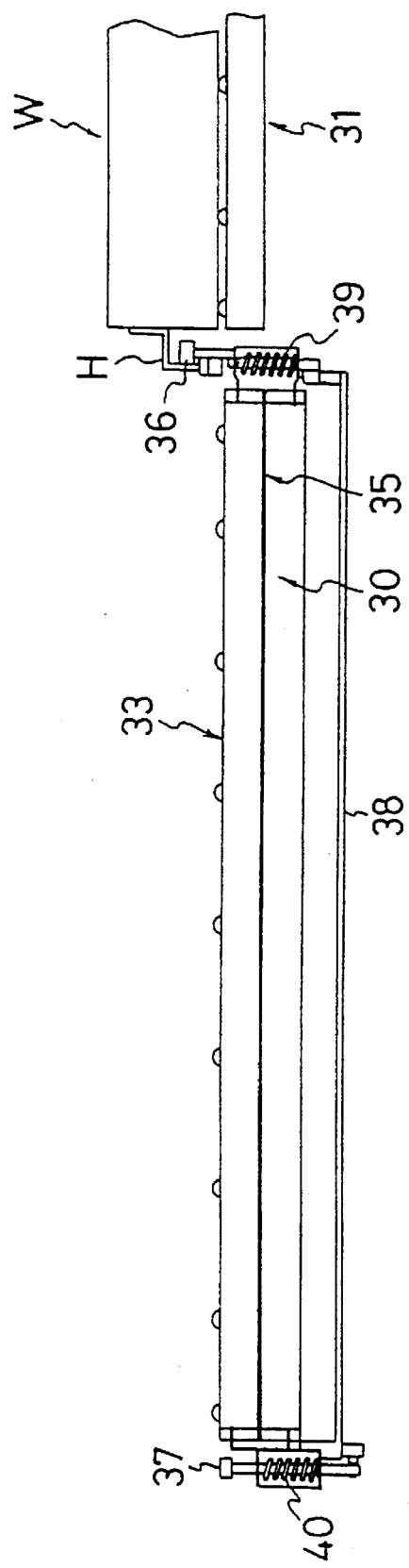
FIG. 18 is a view of the transfer apparatus as seen from the right side of FIG. 17.
Figure 19:
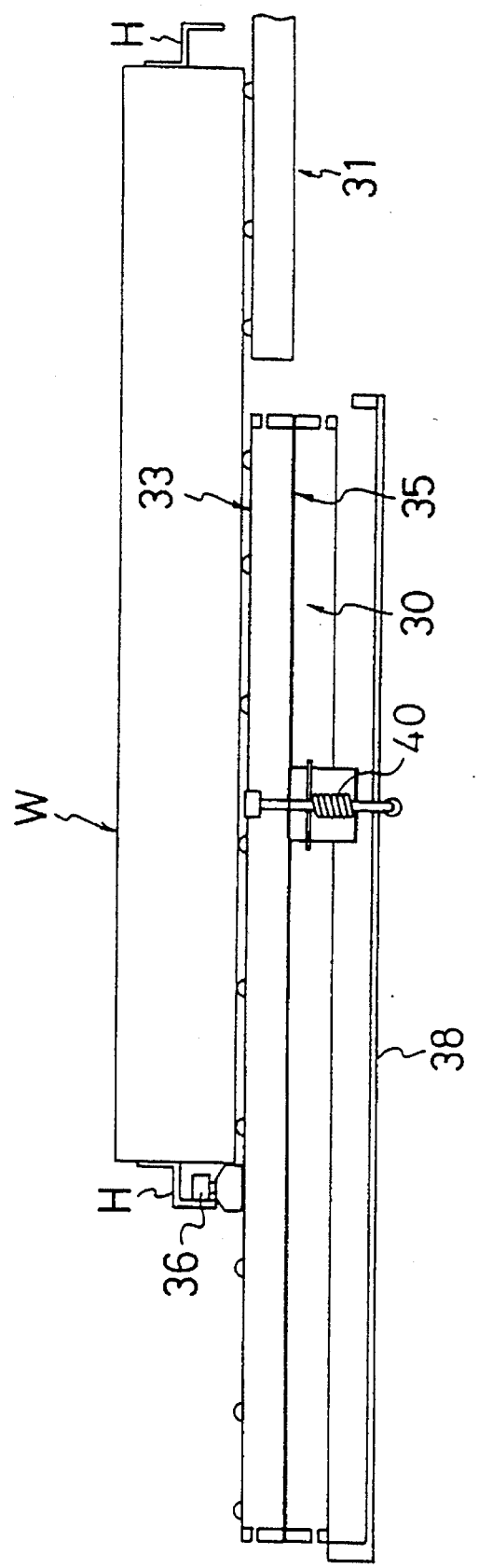
FIG. 19 is a view for explaining the operation of the transfer apparatus shown in FIG. 17.
Figure 20:
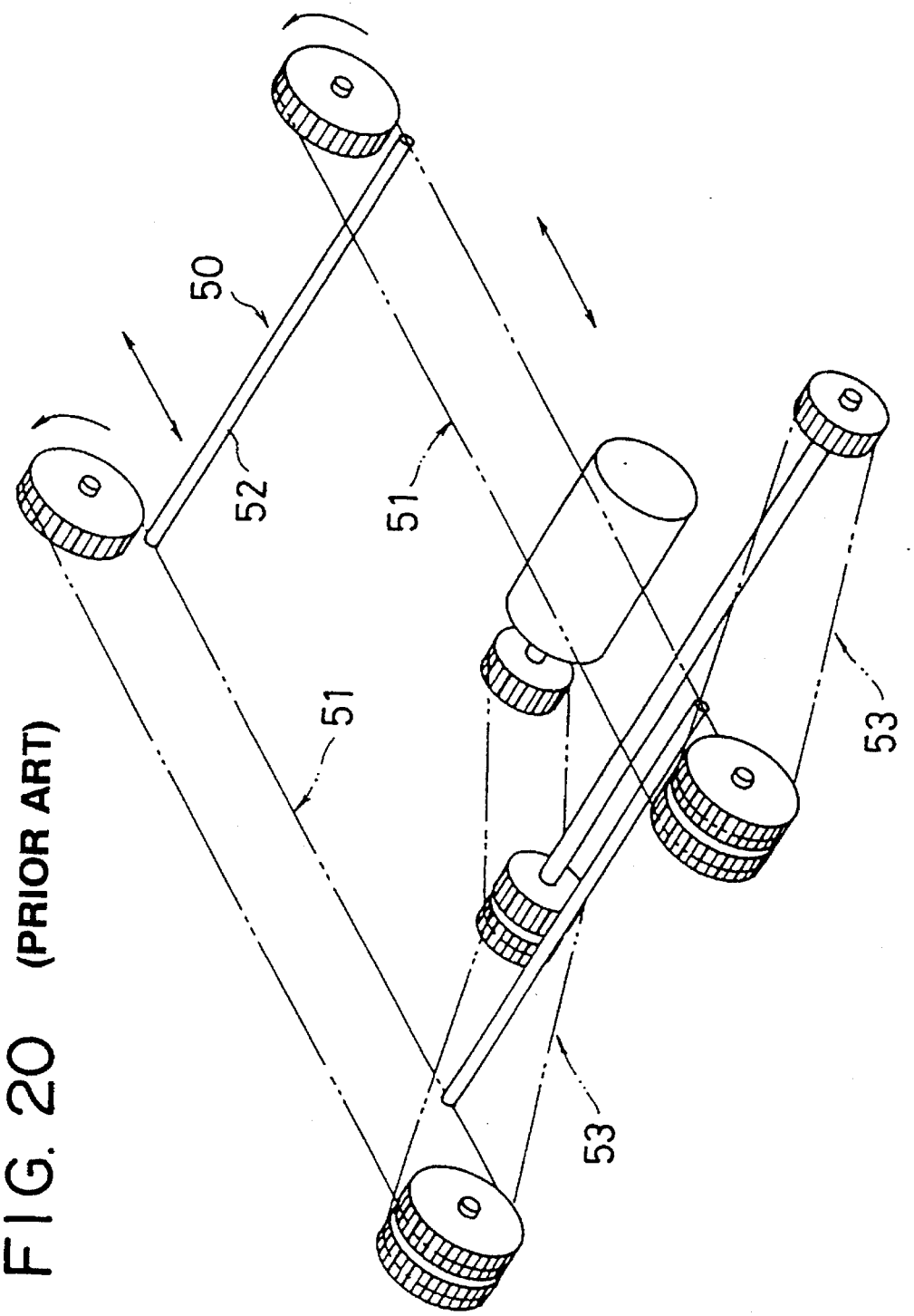
FIG. 20 is a schematic perspective view of a prior art transfer apparatus.
Figure 21:
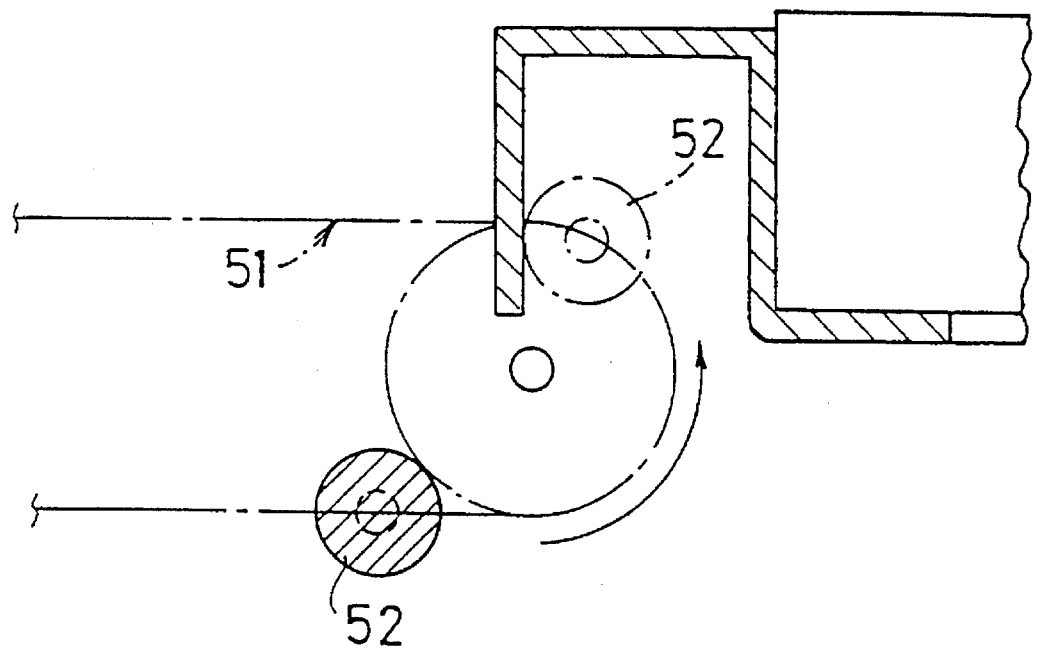
FIG. 21 is a view for explaining the operation of the transfer apparatus shown in FIG. 20.

A transfer apparatus 460 shown in FIG. 16 is another embodiment of the fourth transfer apparatus, which has the structure that, in the first transfer apparatus 60 shown in FIG. 1, second sprockets 472 and third sprockets 473 of the same diameter on the article storage rack side are disposed so as to be in parallel to the handle H such that the traction pin 75 is movable so as to be in parallel to the handle H.

The transfer apparatus 460 can also perform the engagement and disengagement of a traction pin 475 to the tray T.

In addition, the outside diameter of the second sprocket 472 may be different from that of the third sprocket 392. In this case, both the sprockets 472 and 392 may be disposed at such positions that the chains are movable in parallel to the handle.

In a transfer apparatus of the invention as described above, a stored article is transferred using the height difference of a traction pin erected on chains or belts wound around rotors inclined to the horizontal plane, which difference is generated when it is moved, so that it becomes possible to reliably transfer a stored article with a simple structure. In all but the first embodiment disclosed, a stored article is transferred using the height differences of a traction pin and pressing pin erected on chains or belts wound around rotors inclined to the horizontal plane, which is generated when they are moved, so that it becomes possible to certainly transfer a stored article with a simple structure. In these embodiments, when one pin of the traction pin and the pressing pin is moved on the movable table, the other pin is moved in such a position not to abut the bottom of a stored article, so that it becomes possible to certainly prevent contact between the other pin and the stored article.

In the fourth embodiment, the traction pin can be moved so as to be substantially in parallel to a portion to be engaged, so that it becomes possible to reliably perform the engagement of the traction pin with the portion to be engaged.

Hereinafter, further embodiments of the invention will be described with reference to FIGS. 22 to 33 which correspond in general to the first, second and third embodiments described with reference to FIGS. 1–14, but in which the axes of rotation of the sprockets (rotors) are horizontal so that the traction and pressing pins are circulated in a vertical plane, and the pin brackets extend from the chain in the plane of circulation so as to be perpendicular to the rotational axes.

Referring to FIGS. 22–26, a transfer apparatus 560 will be described which has substantially the same structure as that of the first transfer apparatus 60 shown in FIG. 1, except for the pressing pin 176. Therefore, each of the same parts is designated by affixing a numeral 5 to the head of the numeral shown in FIG. 1, and the explanation thereof is omitted.

Figure 23:
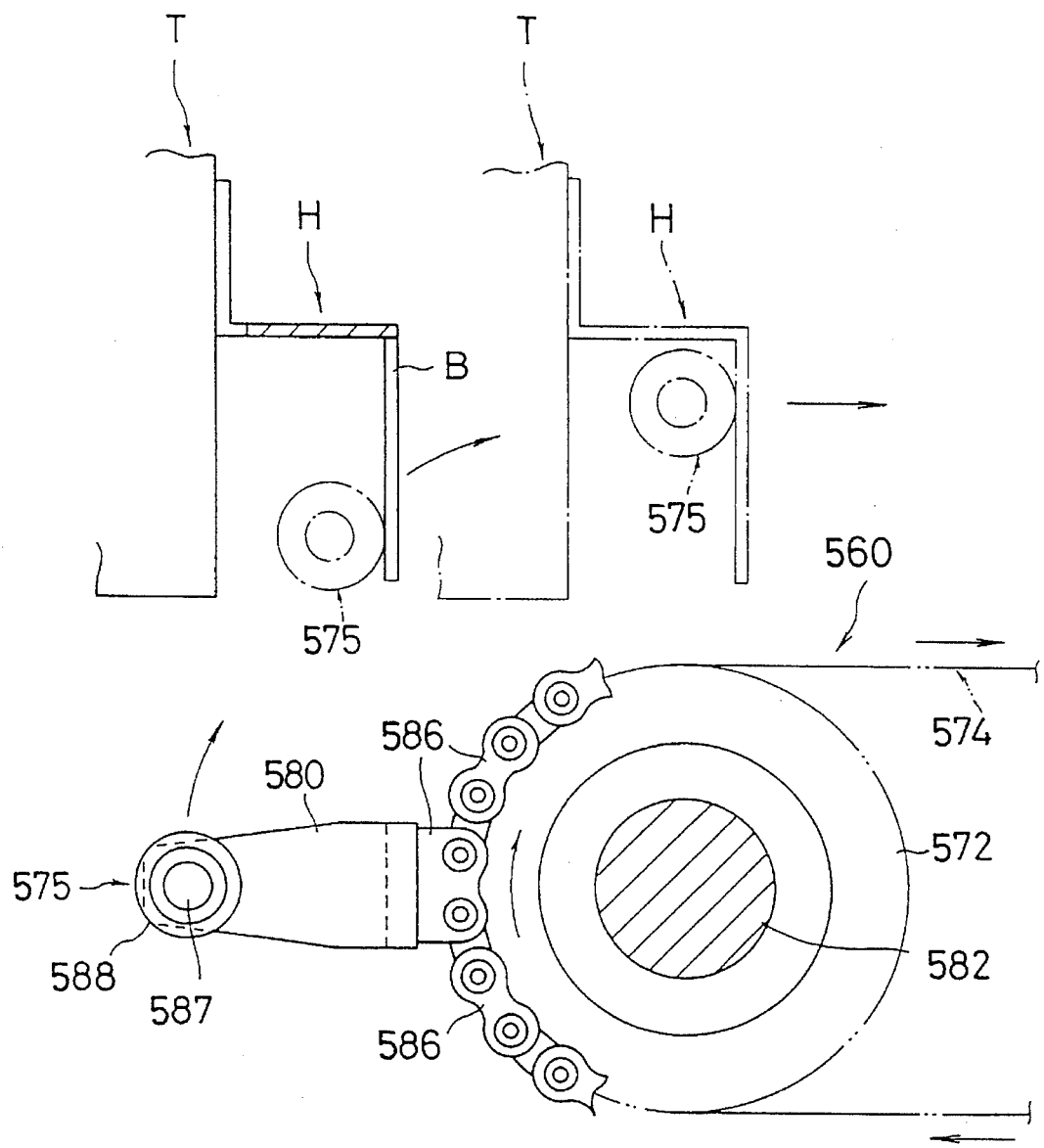
FIG. 23 is a front view of a traction pin of the fifth transfer apparatus.
Figure 24:
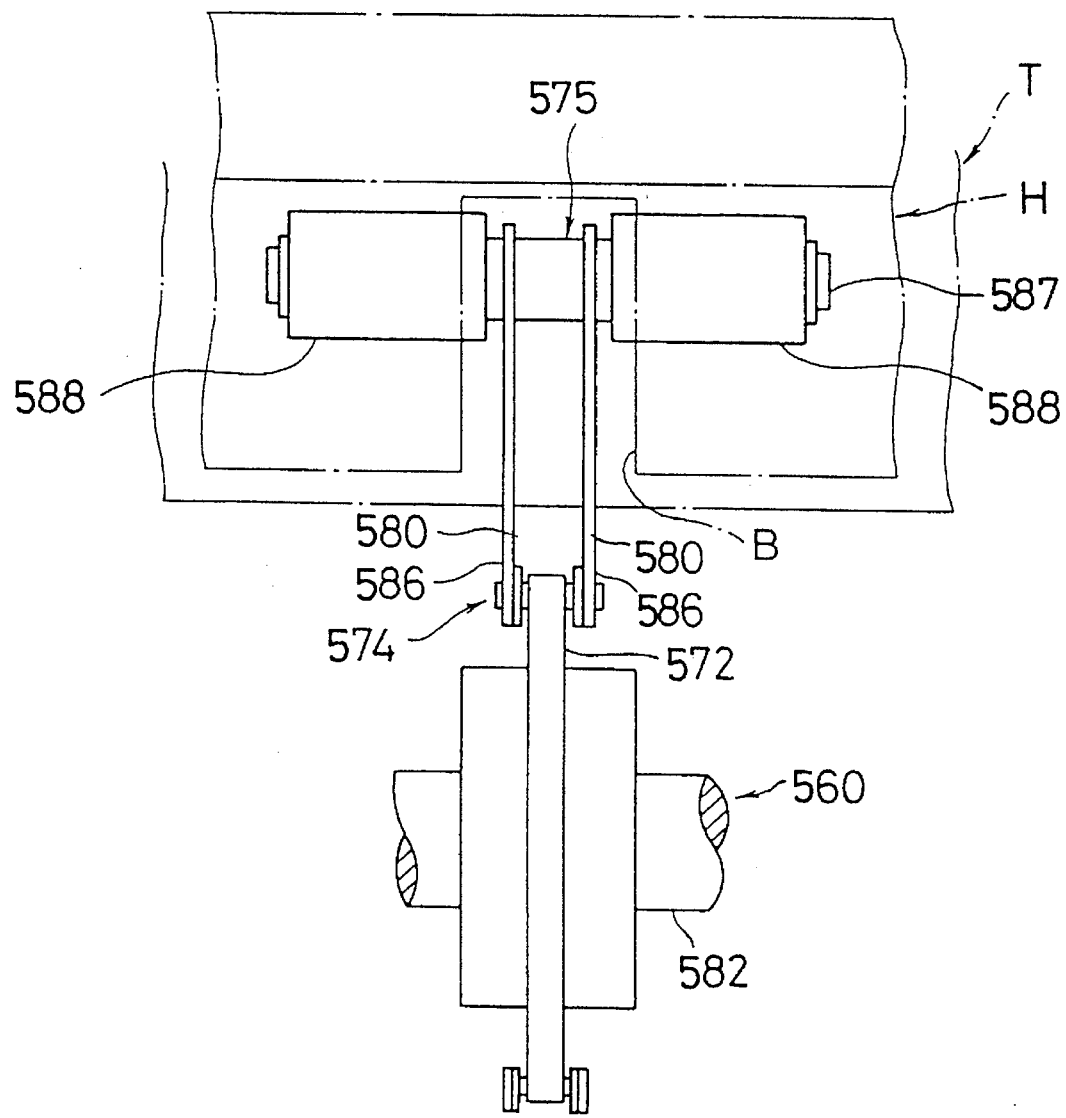
FIG. 24 is a view of the fifth transfer apparatus showing the state where the traction pin engages a handle of a tray as seen from the right side of FIG. 22.
Figure 25:
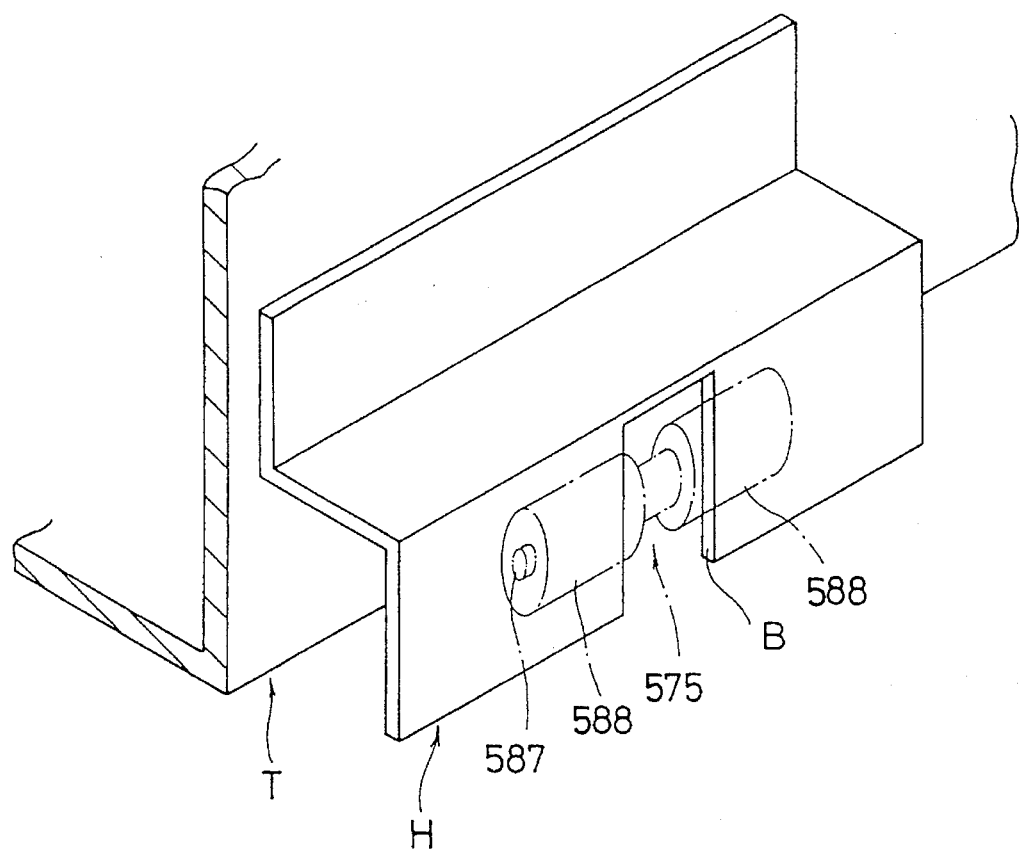
FIG. 25 is a perspective view of a portion of a handle of a tray.

As shown in FIGS. 23, 24 and 25, the handle H of the tray T is formed with a cut-out B for preventing interference with traction pin brackets 580 and 580 described later (see FIGS. 23–25). In addition or alternatively, to prevent interference between the traction pin brackets 580 and 580 and a handle H which is not provided with a cutout B, the diameter of a roller 588 of traction pin 575 (see FIG. 23) which is provided on the traction pin bracket 580 may be increased.

The transfer apparatus 560 (see FIG. 22) includes first and second sprockets 571 and 572, a chain 574 and the traction pin 575.

The first and second sprockets 571 and 572 are arranged along the transfer direction of the tray T (in the direction of the arrow A).

The first and second sprockets 571 and 572 are rotatably provided on a horizontal plate 577 mounted on the lift table 562. A slit 589 for preventing the interference with the traction pin brackets 580 and 580 described later is formed on the horizontal plate 577.

Rotational shafts 581 and 582 of the first and second sprockets 571 and 572 are rotatably provided on the horizontal plate 577 in such a manner as to be perpendicular to the transfer direction of the tray T and to be in the horizontal state.

The rotational shaft 582 of the second sprocket 572 is connected to a motor 578 with a reduction gear.

A chain 574 is wound around the first and second sprockets 571 and 572.

The traction pin 575 (see FIGS. 23 and 24) to engage the handle H of the tray T is provided on the chain 74 so as to be in parallel to the rotational shafts 581 and 582 of the first and second sprockets 571 and 572.

The traction pin 575 (see FIGS. 23 and 24) is provided on the traction pin brackets 580 and 580 integrated with link plates 586 of the chain 574.

The traction pin 575 includes a supporting shaft 587 and rollers 588 and 588.

The operation of the transfer apparatus 560 will be described below.

The transfer apparatus 560 is adapted to transfer the tray T between one article storage rack 61 (see FIG. 4) and the movable table 562 using the height difference of the traction pin 575 generated when it moves along the vertical plane.

Figure 26:
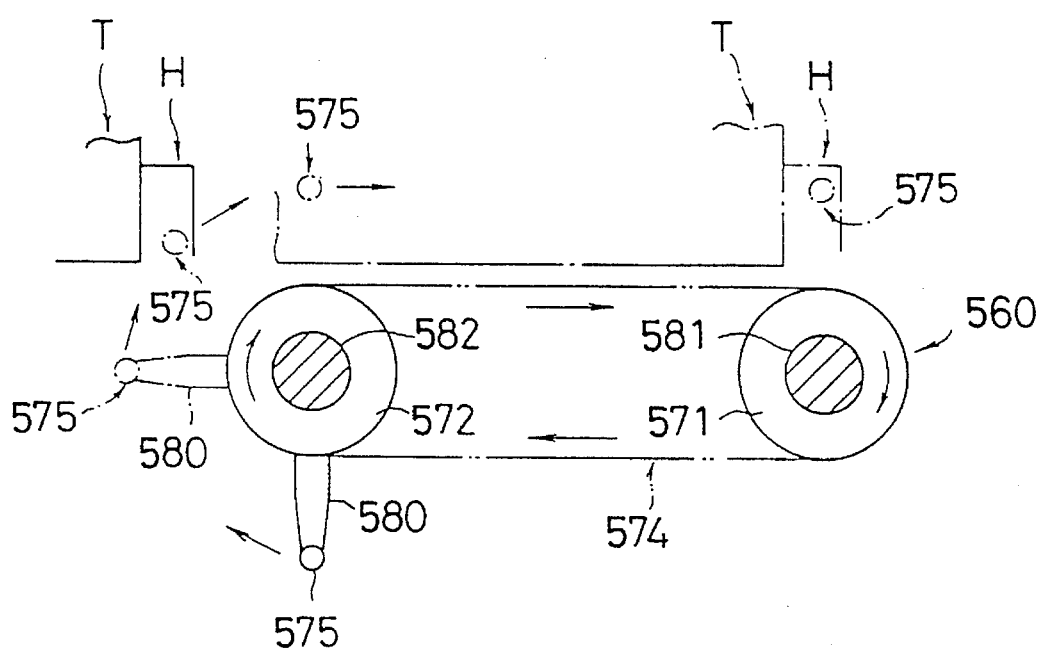
FIG. 26 is a view for explaining the operation of the fifth transfer apparatus.

First, in FIG. 26, the chain 574 is rotated rightwardly (circulated clockwise) to move the traction pin 575 along the second sprocket 572.

The traction pin 575 is moved along the vertical plane from the lower position shown by the solid line to the higher position shown by the imaginary line, to engage, from the lower side, the handle H of the tray T stored in the article storage rack 61 by way of a storing/delivering port 69 (see FIG. 4).

The chain 574 is furthermore rotated rightwardly (clockwise), so that the traction pin 575 is moved from the left to the right at the top of the chain in FIG. 26. During this movement, the traction pin 575 protrudes upwardly from the upper surface of the roller conveyors 568 (see FIG. 22).

The tray T is thus drawn from the storing/delivering port 69 onto the lift table 562, and the rotation of the chain 574 is stopped.

The lift table 562 is lifted up to the desired rack stage 63 (see FIG. 4) and stopped.

The length of the tray T (the length in the transverse direction in FIG. 26) is set such that the tray T, when lifted by the lift table 562, does not abut the handle H of any tray T contained in the article storage rack 61.

The chain 574 is then rotated leftwardly in FIG. 26 (circulated counterclockwise), to move the traction pin 575 from the right to the left, thus pushing the tray T in the desired rack stage 63.

The chain 574 is furthermore rotated leftwardly, so that the traction pin 575 is moved along the second sprocket 572. The traction pin 575 is moved from the higher position to the lower position, and is removed from the handle H.

The transfer of the tray T is thus completed.

Next, the transfer apparatus 660 will be described with reference to FIGS. 27 to 31. The transfer apparatus 660 has substantially the same structure as that of the transfer apparatus 560 shown in FIG. 22, except for the portion of the pressing pin 176, which is provided so that the apparatus 660 can be assembled in a lift table 162 (FIG. 7) lifted and lowered between first and second article storage racks 161 and 170 erected in parallel to each other for transferring a tray T (or stored article) between rack stages 163 of the article storage racks 161 and 170. Therefore, each of the same parts is designated by substituting a 6 instead of a 5 at the head of the numeral shown in FIG. 22, and the explanation thereof is omitted.

The transfer apparatus 660 (see FIG. 7) includes first and second sprockets 671 and 672, a chain 674, a traction pin 675 and a pressing pin 676.

Like the traction pin 575 shown in FIG. 24, the pressing pin 676 (see FIG. 28) is provided on pressing pin brackets 685 and 685 (which are seen to be overlapped in FIG. 28) which are integrated with link plates 686 of the chain 674. Alternatively, an arbitrary pin 679 of the chain 674 may be made longer to be substituted for the pressing pin 676 provided on pressing pin brackets 685 and 685.

In addition, after being pushed from the lift table 162 into the article storage rack 161 or 170 by the pressing pin 676, the tray T can be drawn onto the lift table 162 as needed. To draw the tray T onto the lift table 162, the traction pin 675 must catch the handle H. For this purpose, a spacing L1 between the chain 674 (see FIG. 29) and the traction pin 675 is set to be wider than a spacing L2 between the chain 674 and the pressing pin 676.

Namely, the traction pin 675 is provided outside the area where the pressing pin 676 is moved (outside of the moving region or path of the pressing pin 676).

The pressing pin 676 (see FIG. 27) and the traction pin 675 are provided on the chain 674 at positions which are opposed to each other.

The operation of the transfer apparatus 660 will be described below.

The transfer apparatus 660 is adapted to transfer the tray T between the first and second article storage racks 161 and 170 using the height differences of the traction pin 675 and the pressing pin 676 generated when they are moved along the vertical plane.

Figure 27:
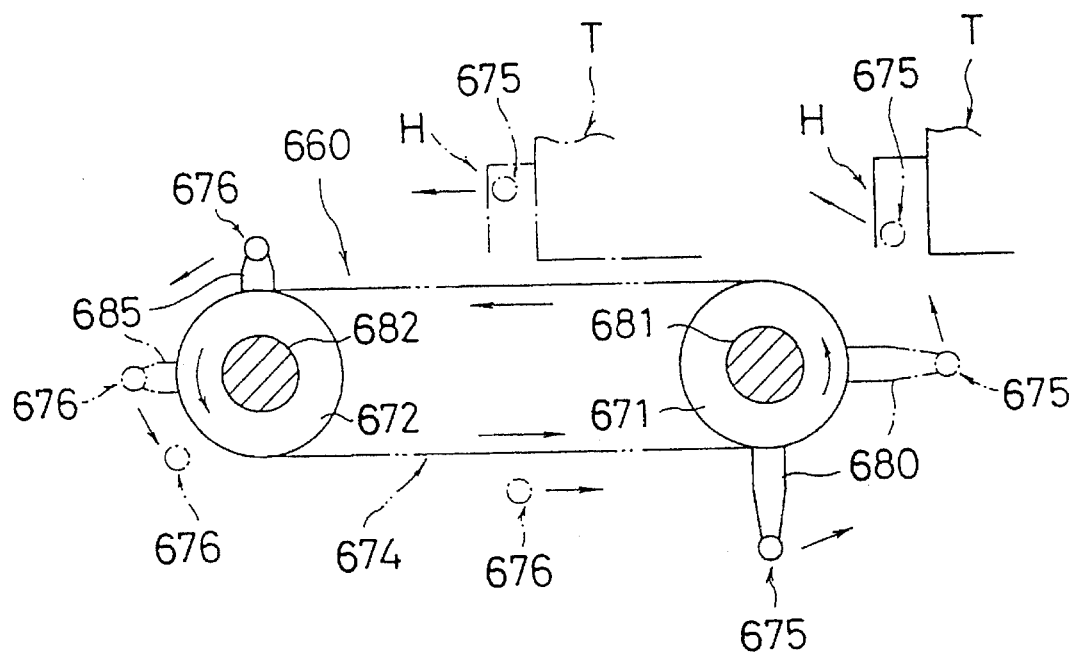
FIG. 27 is a schematic front view of an embodiment of a sixth transfer apparatus of the present invention.
Figure 28:
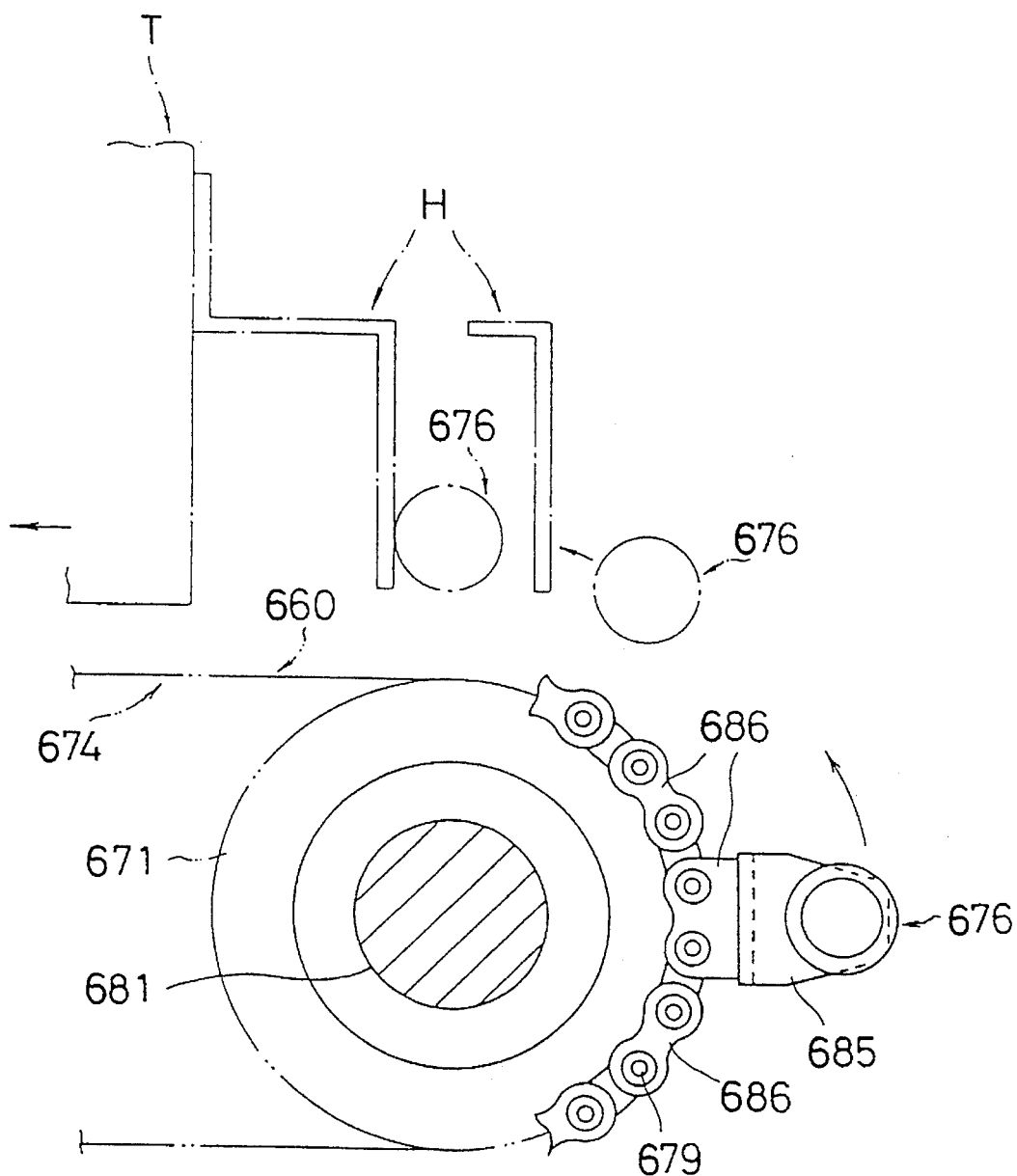
FIG. 28 is a front view of a pressing pin of the sixth transfer apparatus.
Figure 29:
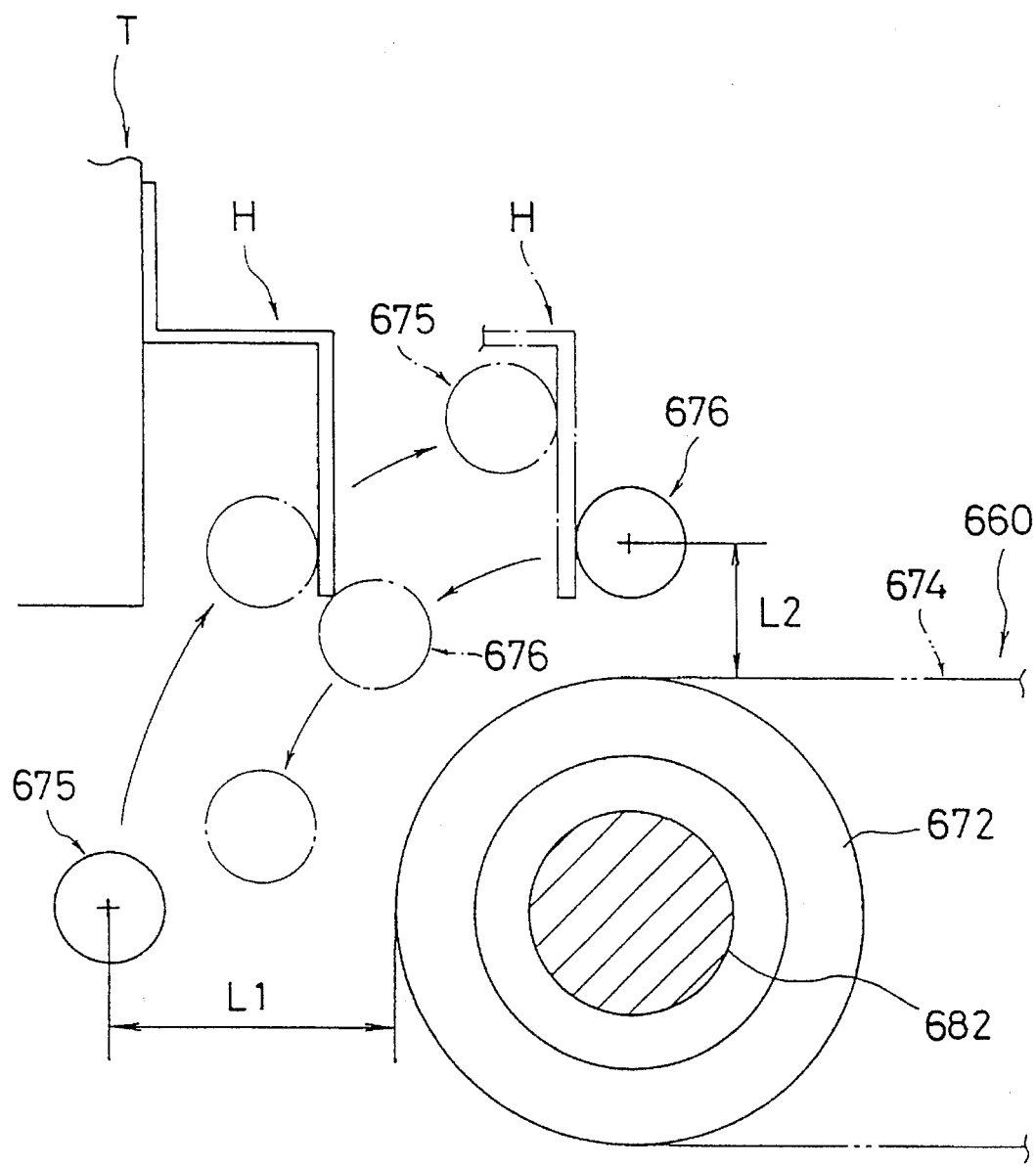
FIG. 29 A view showing the positional relationship between a traction pin and the pressing pin of the sixth transfer apparatus.

First, in FIG. 27, the chain 674 is rotated leftwardly (circulated counterclockwise), to move the traction pin 675 along the first sprocket 671.

The traction pin 675 is moved along the vertical plane from the lower position shown by the solid line to the higher position shown by the imaginary line, to engage, from the lower side, the handle H of the tray T stored in the first article storage rack 161 by way of the storing/delivering port 169 (see FIG. 7).

The chain 674 is furthermore rotated leftwardly, and the traction pin 675 is moved from the right to the left in FIG. 27. During this movement, the traction pin 675 protrudes upwardly from the upper surface of roller conveyors (not shown).

Figure 30:
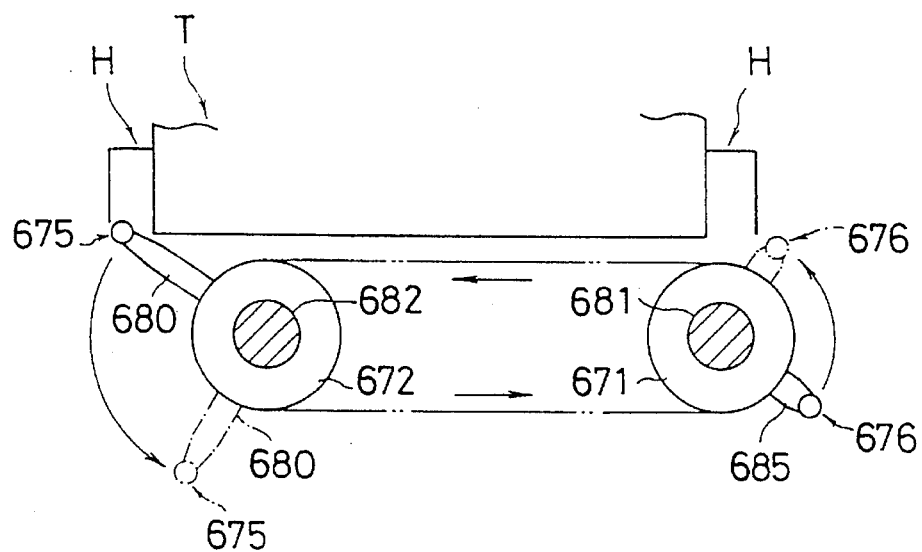
FIG. 30 is a view for explaining the operation of the sixth transfer apparatus.
Figure 31:
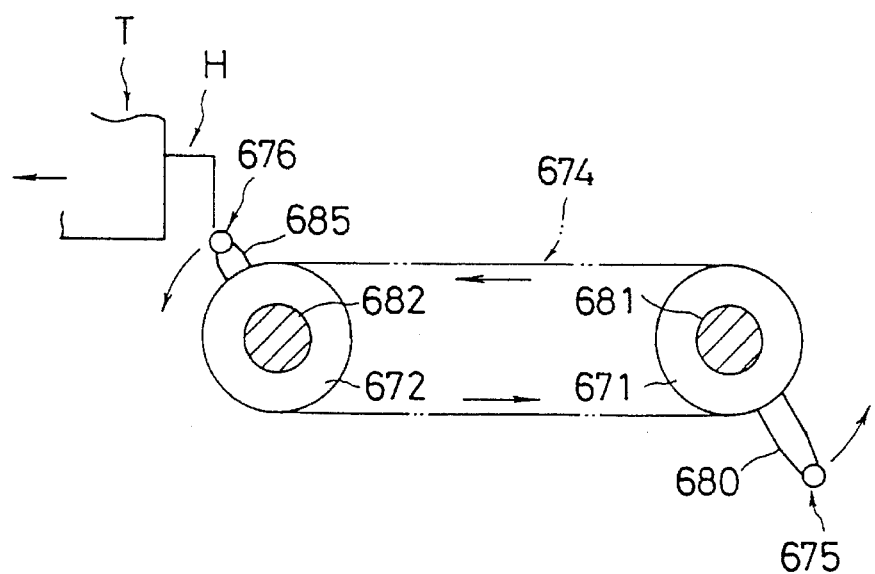
FIG. 31 is a view for explaining the operation of the sixth transfer apparatus.

The tray T is thus drawn from the storing/delivering port 169 of the first article storage rack 161 onto the lift table 162, and the rotation of the chain 674 is stopped (see FIG. 30).

On the other hand, the pressing pin 676 is located at the lower position shown by the solid line so as not to abut the bottom of the tray T.

The lift table 162 is lifted up to the desired rack stage 163, and is stopped.

The chain 674 is then rotated leftwardly in FIG. 30. The traction pin 675 is moved along the second sprocket 672 from the higher position to the lower position, to be removed from the handle H.

The chain 674 is furthermore rotated leftwardly. The pressing pin 676 is moved along the first sprocket 671 from the lower position to the higher position, to engage the handle H provided at the right end of the tray T.

The chain 674 is furthermore rotated leftwardly. The pressing pin 676 presses the handle H provided at the right end of the tray T, to move the tray T from the right to the left on the lift table 162 (see FIG. 31), and pushes it into the desired rack stage 163 of the second article storage rack 170.

The transfer of the tray T from the storing/delivering port 169 to the second article storage rack 170 is thus completed.

In addition, when the chain 674 is rotated rightwardly from the state shown in FIG. 30, the traction pin 675 is moved from the left to the right, so that the tray T can be pushed in the desired rack stage 163 of the first article storage rack 161.

The transfer apparatus 660 is also capable of transferring the tray T between different positions on the same rack stage 163 of the second article storage rack 170.

The length of the tray T used in the transfer apparatus 660 (the transverse length in FIG. 30) is set such that the pressing pin 676 abuts the handle H provided at the right end of the tray T after the traction pin 675 is removed from the handle H provided at the left end of the tray T.

Next, the transfer apparatus 760 will be described with reference to FIGS. 32 and 33.

The transfer apparatus 760 (see FIG. 32) is assembled in a lift table which is lifted and lowered between first and second article storage racks erected in parallel to each other for transferring a tray T (or stored article) between the rack stages (not shown) of the two article storage racks.

Figure 22:
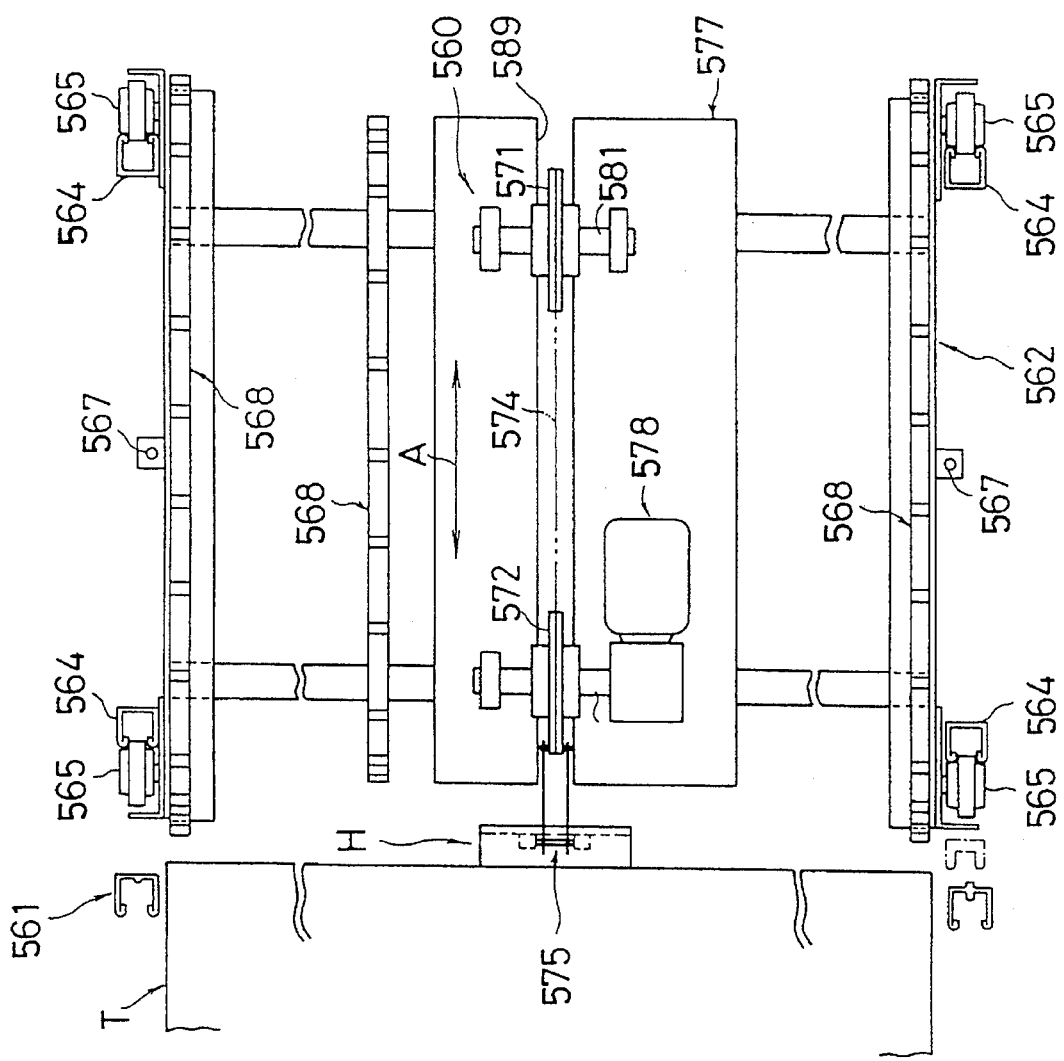
FIG. 22 is a plan view of an embodiment of a fifth transfer apparatus of the present invention.

The lift table itself has substantially the same structure of that of the lift table 562 shown in FIG. 22, and therefore, the drawing and the description of the structure is omitted.

The transfer apparatus 760 includes first, second and third sprockets 771, 772 and 773, a chain 774, a traction pin 775 and a pressing pin 776.

In addition, the transfer apparatus 760 has substantially the same structure as that of the transfer apparatus 660 shown in FIG. 27, except for the portion of the third sprocket 773. Therefore, each of the same parts is designated by changing the head of the numeral shown in FIG. 27 from 6 to 7, and the description of the structure is omitted.

The third sprocket 773 is rotatably provided on the horizontal plate of the lift table such that a rotational shaft 783 thereof is in parallel to rotational shafts 781 and 782 of the first and second sprockets 771 and 772.

The third sprocket 773 is provided under the first and second sprockets 771 and 772.

The operation of the transfer apparatus 760 will be described below.

The transfer apparatus 760 is also adapted to transfer a tray T between first and second article storage racks of the type shown in FIG. 7 using the height differences of the traction pin 775 and the pressing pin 776 generated when they moved along the vertical plane.

Figure 32:
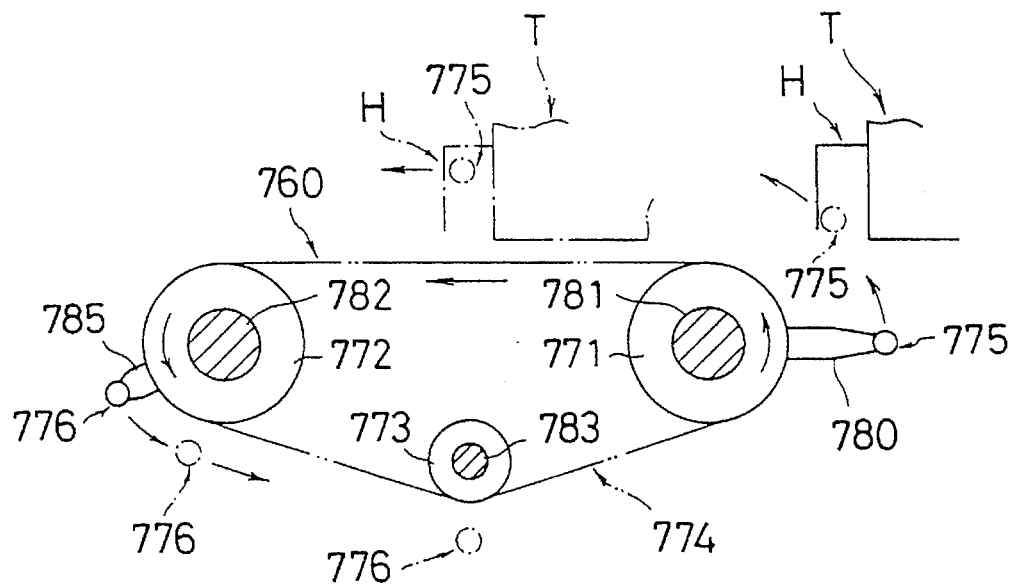
FIG. 32 is a schematic front view of an embodiment of a seventh transfer apparatus of the present invention.

In FIG. 32, the chain 774 is rotated leftwardly (circulated counterclockwise), to move the traction pin 775 from the third sprocket 773 to the first sprocket 771.

The traction pin 775 is moved from the lower position shown by the solid line to the higher position shown by the imaginary line, to engage, from the lower side, a handle H of the tray T stored in the article storage rack by way of a storing/delivering port.

The chain 774 is furthermore rotated leftwardly. The traction pin 775 protrudes upwardly from the upper surface of roller conveyors (not shown) in FIG. 32, to be moved from the right to the left, thus drawing the tray T from the storing/delivering port of the first article storage rack.

On the other hand, the pressing pin 776 is located at a position lower than the traction pin 775.

The lift table 762 is lifted up to the desired rack stage, and is stopped.

Figure 33:
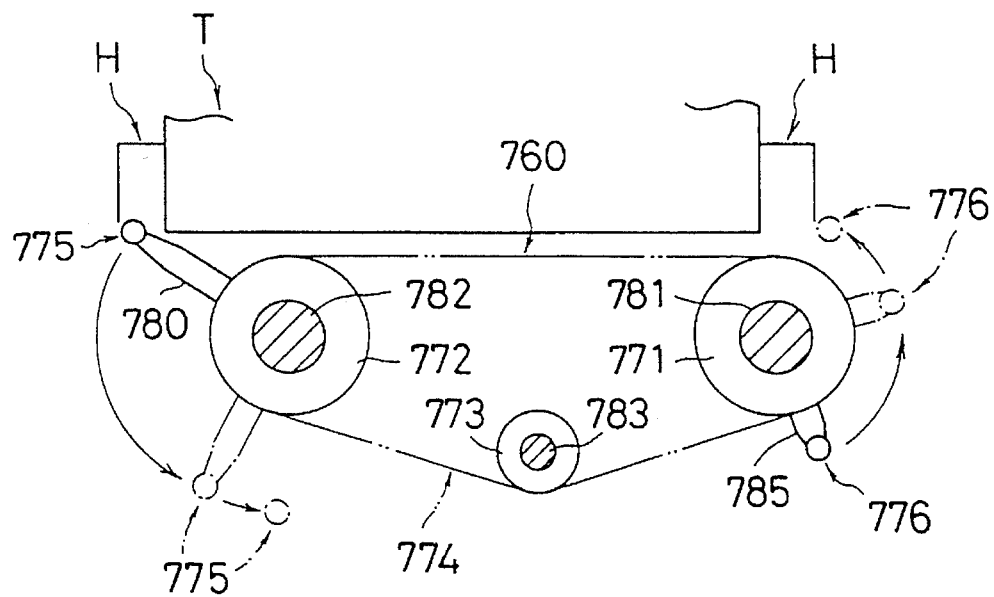
FIG. 33 is a view for explaining the operation of the seventh transfer apparatus.

The chain 774 is then rotated leftwardly in FIG. 33, and the traction pin 775 is moved from the right to the left. The traction pin 775 pulls the handle H provided at the left end of the tray T, and moves along the second sprocket 772. The traction pin 775 is thus moved from the higher position to the lower position, to be removed from the handle H.

The chain 774 is furthermore rotated leftwardly. The pressing pin 776 is moved along the first sprocket 771 from the lower position to the higher position, and abuts the handle H provided at the right end of the tray T. The pressing pin 776 presses the tray T and moves it from the right to the left on the lift table, thus pushing the tray T in the desired rack stage of the second article storage rack.

The transfer of the tray T from the storing/delivering port to the second article storage rack is thus completed.

In addition, when the chain 774 is rotated rightwardly from the state shown in FIG. 33, the traction pin 775 is moved from the left to the right, so that the tray T can be pushed in the desired rack stage of the first article storage rack.

The transfer apparatus 760 is also capable of transferring the tray T between rack stages in the second article storage rack.

In the transfer apparatus 760, the whole length of the chain 774 is made longer by the presence of the third sprocket 773, and thereby the spacing between the traction pin 775 and the pressing pin 776 is widened; accordingly, it can be avoided that the pressing pin 776 abuts the other handle H before the traction pin 775 is perfectly removed from one handle H.

In each transfer apparatus, the chain may be replaced by a belt.

FIGS. 4 and 7 illustrate that each of the transfer apparatuses 60, 160 and 260, 360, 460, 560, 660 and 760 is assembled in a lift table which is lifted and lowered along an article storage rack in which containing areas are vertically arranged. However, a transfer apparatus of the invention could be assembled in a transversely movable table (not shown) which moves transversely along a horizontal rack (not shown) in which containing area are horizontally arranged, so that the apparatus can similarly transfer a tray between the horizontal rack and the movable table.

When a member (a portion to be engaged) equivalent to the handle H of the tray T protrudes from the workpiece, the traction pin may engage the member without containing the workpiece in the tray, or the workpiece may be directly transferred by pressing of the pressing pin.

In a transfer apparatus as described in the last three embodiments, a stored article is transferred using the height difference of a traction pin generated when it is moved along a vertical plane. Accordingly, a mechanism of extending and retracting the traction pin, which has been conventionally required, can be eliminated, and thereby the stored article can be reliably transferred with a simple structure.

Since being provided on a chain or a belt by way of brackets, the traction pin can engage a portion to be engaged by only one chain or belt, though the prior art apparatus has required two chains or belts, thereby simplifying the structure.

In each of the last two described transfer apparatuses, a stored article is transferred using the height differences of a traction pin and a pressing pin generated when they are moved along a vertical plane. Accordingly, a mechanism of extending and retracting the traction pin and the pressing pin, which has been conventionally required, can be eliminated, and thereby the stored article can be reliably transferred with a simple structure.

In the last described embodiment, since the whole length of a chain is made longer by the presence of a third sprocket so as to widen the spacing between the traction pin and the pressing pin, it can be avoided that the pressing pin abuts a portion to be engaged at the other end of the stored article before the traction pin is removed from a portion to be engaged at one end thereof.

I claim:

1. A transfer apparatus assembled in a movable table moved along an article storage rack for transferring a tray between said article storage rack and said movable table along a transfer direction, said tray having a bottom which when said tray is supported by said apparatus defines a reference plane and which is of a certain width in a direction perpendicular to said transfer direction, said apparatus comprising:

first, second and third rotors each having a coaxial rotational shaft, said rotors being arranged along said transfer direction such that said rotational shafts of said rotors are perpendicular to said transfer direction and are inclined to said reference plan;

an endless chain or belt wound around said first, second and third rotors;

a traction pin erected on said chain or belt in such a manner as to be in parallel to said rotational shafts for engaging a portion to be engaged of said stored article; and a pressing pin erected on said chain or belt in such a manner as to be in parallel to said rotational shafts for abutting said stored article, said traction pin and said pressing pin being arranged at diagonally opposite positions with respect to said chain or belt;

wherein said chain or belt as viewed from a plane which is parallel to said reference plane is smaller in width in a direction perpendicular to said transfer direction than said width of said bottom of said tray; and wherein said first and second rotors are located at opposite ends of a transfer path which is traversed by said chain or belt and is on a first lateral side of said first and second rotors, said transfer path being directed in a longitudinal direction which is parallel to said transfer direction, and said third rotor is located along a return path which is traversed by said chain or belt and is on a second lateral side of said first and second rotors which is opposite from said first lateral side, said transfer path and said return path being in a plane which is inclined at an acute angle to said reference plane and said third rotor being located along said return path at a longitudinal position which is between said first and second rotors.

2. A transfer apparatus as claimed in claim 1, wherein said pins bisect said belt into two substantially equal lengths between said pins.

3. A transfer apparatus as claimed in claim 1, further comprising another rotor around which said endless chain or belt is wound.

* * * * *